United States Patent [19]

Chen et al.

[11] Patent Number: 6,009,442
[45] Date of Patent: Dec. 28, 1999

[54] COMPUTER-BASED DOCUMENT MANAGEMENT SYSTEM

[75] Inventors: Ying-Jye James Chen, San Jose; David R. Ferguson, Fremont; An N. Hong, Mountain View; Dani Suleman, Fremont; Gregory L. Whittemore, San Jose, all of Calif.

[73] Assignee: Caere Corporation, Los Gatos, Calif.

[21] Appl. No.: 08/941,099

[22] Filed: Oct. 8, 1997

[51] Int. Cl.$^6$ .............................. G06F 17/30; G06T 1/00
[52] U.S. Cl. ......................................... 707/522; 707/500
[58] Field of Search .................................. 707/522, 500, 707/523, 531, 533, 526, 532, 7, 515; 345/326, 116

[56] References Cited

U.S. PATENT DOCUMENTS

| | | | |
|---|---|---|---|
| 5,060,135 | 10/1991 | Levine et al. | |
| 5,369,508 | 11/1994 | Lech et al. | |
| 5,459,307 | 10/1995 | Klotz, Jr. | 235/454 |
| 5,499,108 | 3/1996 | Cotte et al. | |
| 5,715,381 | 2/1998 | Hamilton | 395/114 |
| 5,754,939 | 5/1998 | Herz et al. | 455/4.2 |
| 5,778,397 | 10/1998 | Kupiec et al. | 707/500 |

OTHER PUBLICATIONS

Rose, D.E., "Content Awareness in a File System Interface: Implementing the 'Pile' Metaphor for Organizing Information." Proceedings of the Annual International ACM SIGIR Conference on Research and Development in Information Retrieval. Pittsburgh, Jun. 1993, pp. 260–269.

"Intelligent Document Retrieval." IBM Technical Disclosure Bulletin, vol. 34, No. 1, Jun. 1, 1991, pp. 403–405.

Gottesman, B. et al., "Ending the Paper Chase." PG Magazine, Oct. 24, 1995, pp. 129, 131, 134, 135, 140, 142, 144, 151, 152, 154–156, 160–162.

International Search Report issued on Feb. 15, 1999, in connection with Counterpart PCT Application No. PCT/US98/20488.

"Visioneer Announces PaperPort Software for Everyone", Visioneer, Inc., PRNewswire, Fremont, CA, Nov. 4, 1996.

"Visioneer Awarded Patents on Innovative Paper Management Technology and Product Design", Visioneer, Inc. PRNewswire, Palo Alto, CA, Jul. 9, 1996.

"Technology Enables Users to Have Paperless Office and Easily File, Store, Retrieve, Annotate and Distribute More Than 100,000 Electronically Created or Paper–Based Documents of Unlimited Size and File Type", Computhink, Business Wire, Chicago, IL, Oct. 18, 1996.

*Primary Examiner*—Joseph H. Feild
*Assistant Examiner*—Alford W. Kindred
*Attorney, Agent, or Firm*—Burns, Doane, Swecker & Mathis, L.L.P.

[57] ABSTRACT

A computer-based electronic document and/or paper-based document management application program. The program provides an efficient way to automatically import, index, categorize, store, search, retrieve, manipulate and archive electronic documents. The program is also capable of managing documents regardless of document type or document format.

24 Claims, 18 Drawing Sheets

COMPUTER-BASED DOCUMENT MANAGEMENT SYSTEM

BACKGROUND

The present invention relates to computer-based document management systems. More particularly, the present invention relates to a computer-based document management system that has the capability of importing, organizing, browsing, searching and viewing paper-based documents and electronic documents of any type or format.

In today's business environment, most businesses, from small businesses to large corporate entities, organize and maintain a tremendous amount of information, particularly information in the form of paper-based documents and electronic documents. The task of organizing and maintaining such a large number of documents, as well as document types, can, and typically is, a time consuming and costly matter.

In response, the computer industry, particularly the computer software industry, offers a number of computer application programs designed to help mitigate this problem. Some of these computer application programs work in conjunction with optical scanners to automatically import paper-based documents into the host computer. Other application programs are directed more specifically at providing electronic file management services for existing electronic documents. Some of the more advanced computer application programs attempt to integrate a number of different capabilities into a single application program. Among the capabilities that some of the more advanced programs provide are automated document importing, storage, manipulation, retrieval, indexing, archiving, exporting and document annotation. Included among these more advanced application programs are PageKeeper by Caere Inc., PaperPort by Visioneer, and PAGIS by Xerox.

Despite the many features already offered by various software products currently on the market, there is still a tremendous need to provide a more efficient product. This is especially true regarding the way in which existing application programs allow a user to browse through an electronic document collection in an attempt to identify one or more specific documents.

For example, a document collection may include dozens of related documents. However, the user may wish to identify and access but one of those documents. Given the capabilities of existing electronic document management programs, the user is often forced to open each document, one at a time, then read or browse through all or a portion of each document to determine whether a document is, in fact, the desired document. As this would also involve opening a corresponding host application program for each document, the task of identifying a particular document from amongst a large number of documents in a document collection can become extremely difficult and time consuming. Therefore, a computer-based electronic document management program that has the ability to efficiently and automatically analyze, store, browse, retrieve and display summary information for electronic documents, without requiring the user to either enter the summary information or open a document, would be extremely desirable.

SUMMARY

The present invention is directed at a method and a computer application program for managing electronic documents in a computer-based system. The present invention provides a number of improvements over prior products, particularly, the way in which the present invention automatically analyzes, stores, browses, retrieves and displays electronic document summary information.

Accordingly, it is an object of the present invention to automatically analyze and store summary information for an electronic document.

It is another object of the present invention to provide a user with a way to quickly browse through a document collection and identify a specific electronic document without first having to open each document, along with a corresponding host application program.

It is yet another object of the present invention to provide a user with a way to quickly and efficiently browse through a collection of electronic documents and identify a specific electronic document by displaying summary information for the electronic document.

In accordance with one aspect of the present invention, the foregoing and other objects are achieved by a method for identifying an electronic document in an electronic document collection. The method involves generating summary information for the electronic document based upon an electronic analysis of the document, then storing the summary information in a document data structure corresponding to the electronic document regardless of document type or document format. The method also involves displaying a representation of the electronic document, and activating a display containing the summary information stored in the document data structure corresponding to the electronic document.

In accordance with another aspect of the present invention, the foregoing and other objects are achieved by a method for browsing a collection of electronic documents and/or a computer-readable storage medium having stored therein an electronic document management program. The method and/or program involve analyzing an electronic document, and storing browsing information or document summary information in a document data structure corresponding to the electronic document, based on the analysis of the electronic document. The method and/or program also involve displaying the browsing information or the document summary information stored in the document data structure.

BRIEF DESCRIPTION OF THE DRAWINGS

The objects and advantages of the invention will be understood by reading the following detailed description in conjunction with the drawings, in which.

DETAILED DESCRIPTION

Figure 1A:
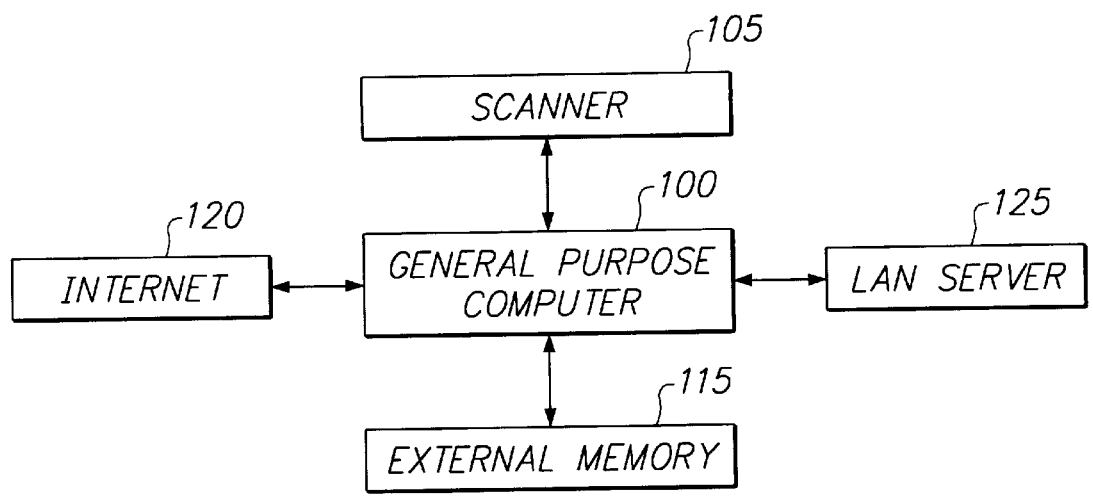
FIG. 1A is a diagram of a general purpose computer which could be used to implement the present invention.

The present invention involves a system and/or method for managing electronic documents in a general purpose computer, such as the general purpose computer 100 illustrated in FIG. 1A. The present invention further includes a system and/or method for importing electronic documents and electronic representations of paper-based documents from any number of different sources. For example, the present invention is capable of importing electronic representations of paper-based documents from a scanner 105, word processing documents from an internal memory such as a RAM (not shown) or an external memory 115 (e.g., a hard drive), e-mail from an internet connection 120, or a document containing graphical image data from a server 125 supporting a local-area network, to which the general purpose computer 100 is connected. Once a document has been imported, the present invention employs a system and/or method for automatically categorizing, indexing, browsing, viewing and otherwise manipulating the document, along with each of the other documents contained in what is herein referred to as the document collection. As one skilled in the art will readily appreciate, the present invention can be implemented in software, using standard programming methods and techniques which are well known in the art.

Figure 1B:
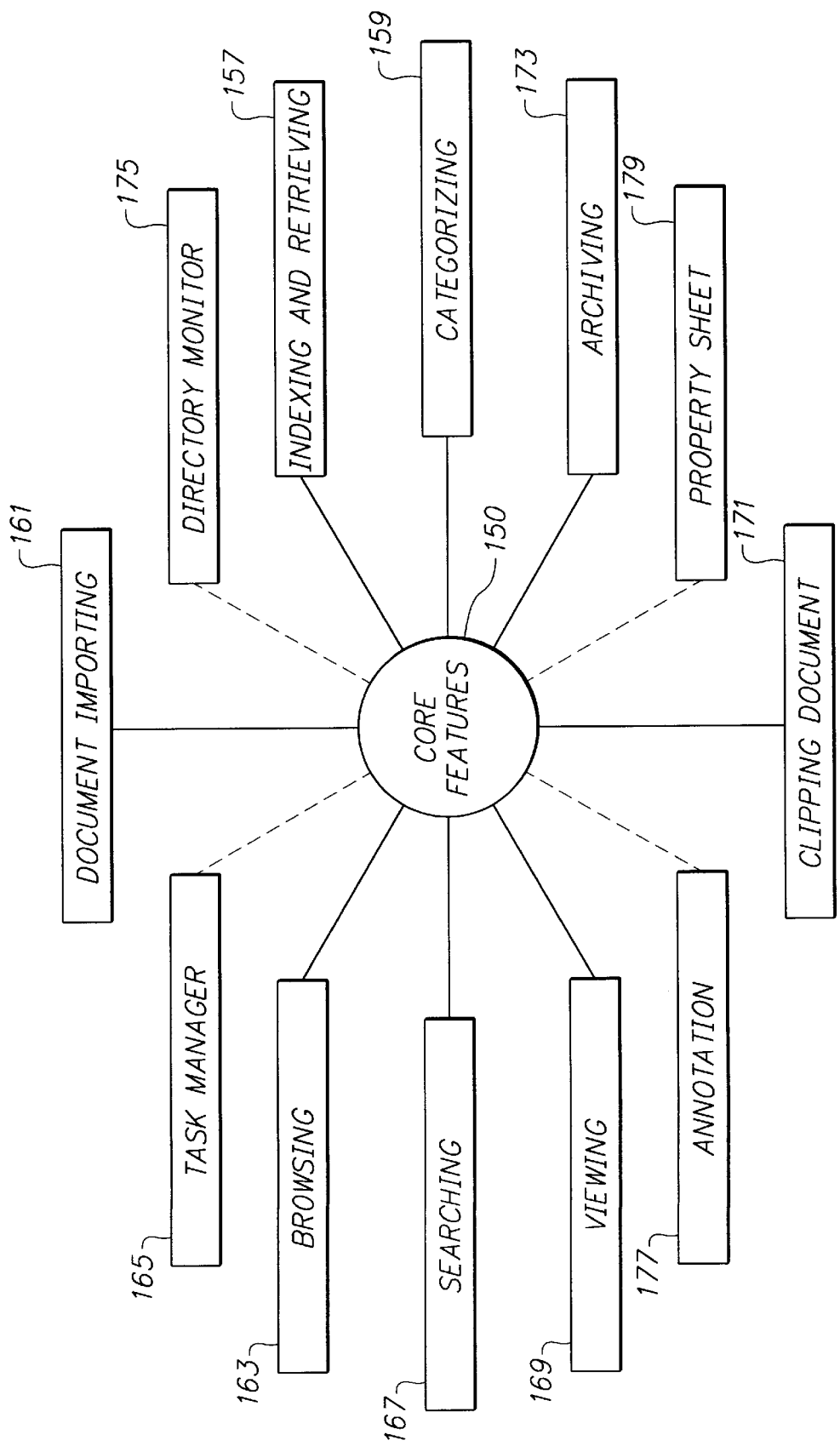
FIG. 1B is a diagram illustrating some of the features and utilities employed by the present invention.

The present invention employs a number of core features 150 as well as a number of document management utilities as illustrated in FIG. 1B. The core features 150 refer to certain attributes or characteristics that the present invention employs and/or executes in the background to support the various document management utilities. For the purpose of simplicity, the following description of the present invention is divided into the various core features 150 and document management utilities. The order in which each invention feature and/or utility is presented herein below is not intended to limit the present invention in any way. Rather, the scope of the invention is given by the appended claims.

DATA STORAGE (STG) FILES

The first core feature 150 of the present invention is a unique data storage (STG) structure referred to herein as an STG file. The present invention maintains an STG file for each document in the document collection. A new STG file is created for each new document, and an existing STG file may be updated if the corresponding document is modified.

Each STG file contains a number of standardized data fields. This provides a way to maintain various attribute data and other information for a given document in a common, standardized format regardless of the document's type (e.g., text document versus image document) or the document's format (e.g., JPEG versus HTML). In a preferred embodiment, all STG files are stored in a common disk directory.

Figure 2A:
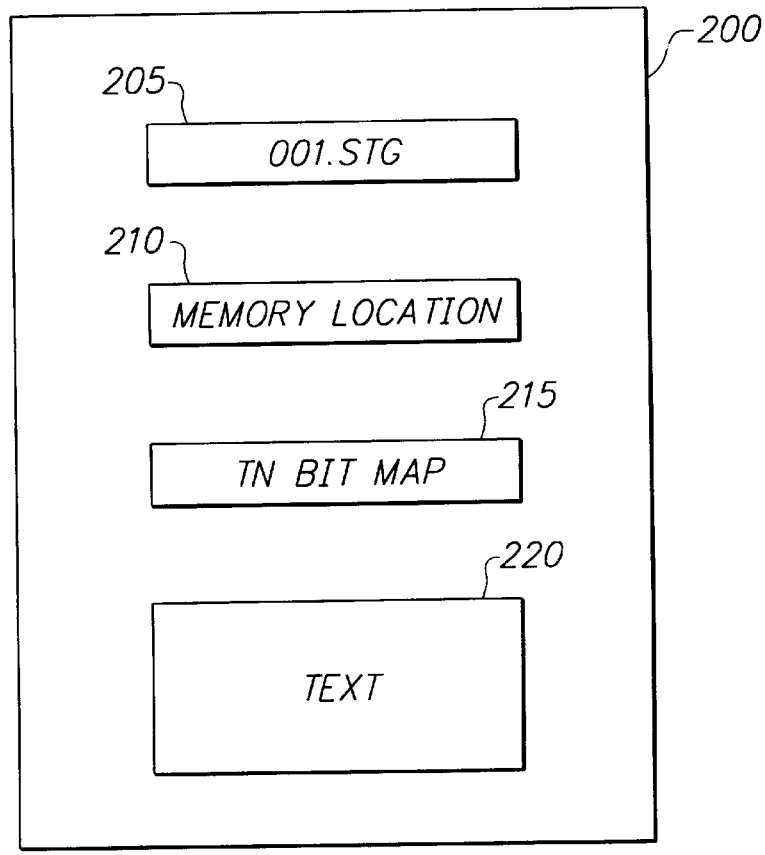
FIG. 2A is an exemplary representation of an STG file associated with a document.

FIG. 2A represents an exemplary STG file 200 along with some of the data fields that may be contained therein. For example, STG file 200 may include a data field 205 which contains a file name, e.g., "001,STG", to identify the corresponding STG file 200. The STG file 200 may also include a data field 210 and a data field 215 which reflects the memory location of the corresponding document and a bit map defining a representative thumbnail respectively. The STG file 200 may also contain a data field 220 which reflects the raw text associated with the corresponding document. The raw text data is primarily used for indexing purposes. Indexing is described in greater detail below. In addition, the STG file 200 is likely to contain a number of other data fields (not shown) for such attributes as document author, publishing date, word count, annotations, and/or key words if the document belongs to a particular category. Categories and categorization of documents are also explained in detail below. If the document corresponding to the STG file is an image document, data fields may be included for such attributes as image type (e.g., color, black and white, or gray scale), image dimension, and/or image meta-text with text positioning information.

Figure 2B:
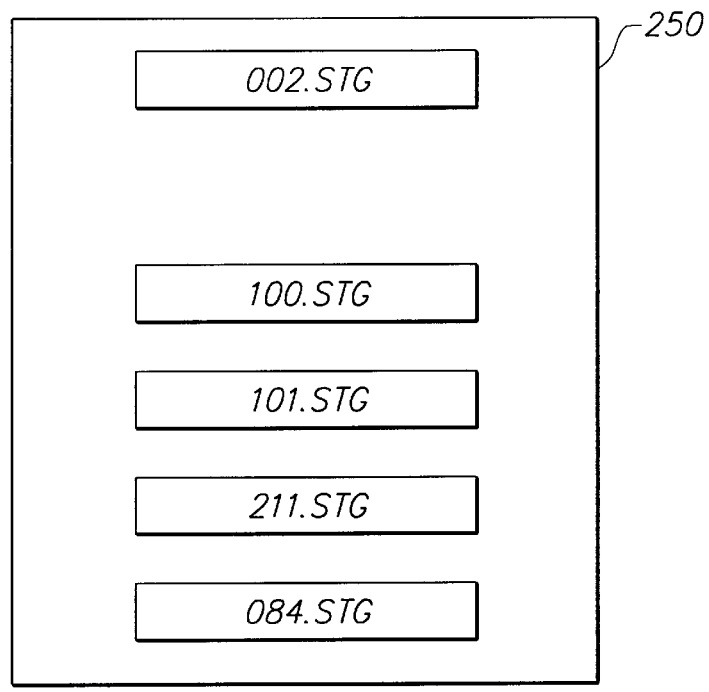
FIG. 2B is an exemplary representation of an STG file associated with a clipped document.

An STG file also exists for each clipped document stored by general purpose computer 100. A clipped document is a special type of compound document data structure. Typically, a clipped document incorporates a number of related or component documents in a particular document order similar to attaching a number of physical documents together with a paper clip. When a clipped document is created, an STG file is generated. Unlike STG files associated with individual documents, an STG file associated with a clipped document includes a data field having its own file name, e.g., "002.STG" and a number of additional data fields which contain the identity of the STG files corresponding to the component documents. FIG. 2B shows an exemplary STG file 250 that is associated with a clipped document. As illustrated, STG file 250 links the clipped document with four component documents, wherein the STG files that correspond with the four component documents are identified by their file names as follows: 100.STG, 101.STG, 211.STG and 084.STG. Clipped documents are described in greater detail below.

Aside from creating an STG file for each new document and each new clipped document, an existing STG file may be updated if the corresponding document or clipped document is edited or modified in some way. For example, if a user modifies an existing word processing document, upon saving the modified version of the document, the corresponding STG file is updated, if necessary, particularly the text data field 120.

ORGANIZATION OF THE DOCUMENT COLLECTION

In a preferred embodiment, the document collection is organized into a hierarchy of files, clipped documents, and electronic folders, wherein electronic folders may, in turn, contain additional files, clipped documents and nested folders. The data that defines how the hierarchy of files, clipped documents and electronic folders are organized with respect to each other is maintained in a compound data structure referred to herein as the document collection organization (DCO) file.

Figure 3:
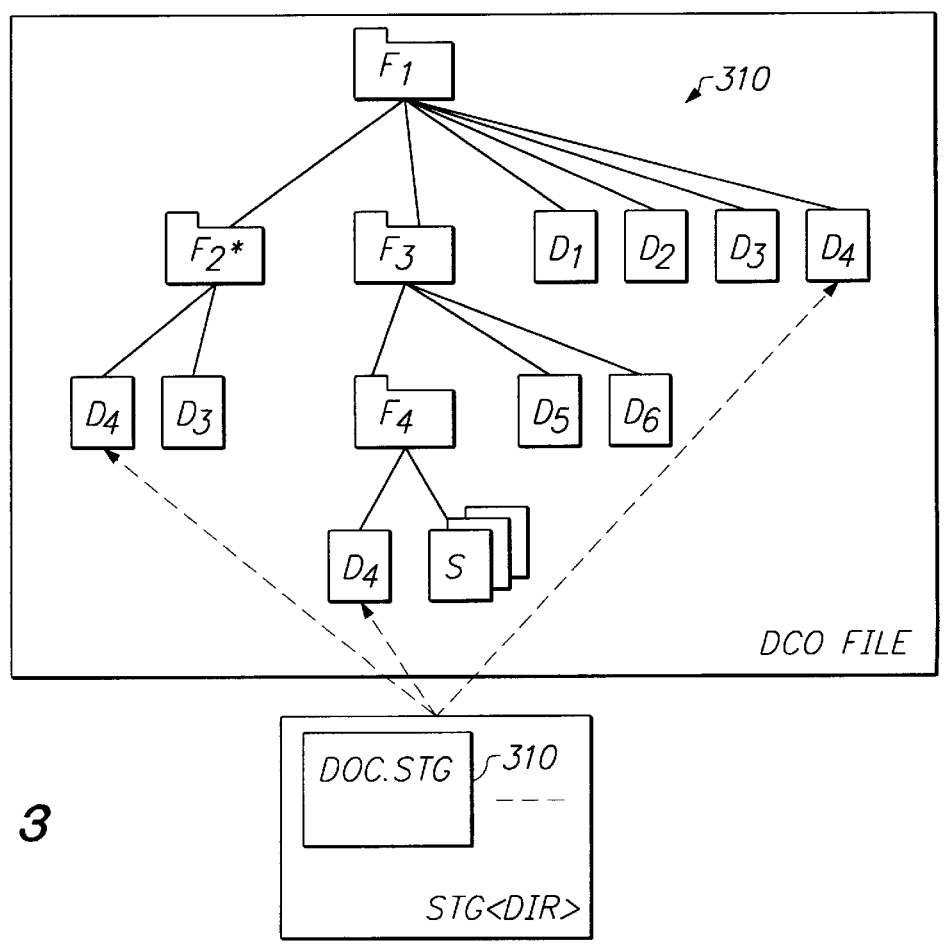
FIG. 3 depicts the hierarchical organization of an exemplary document collection in accordance with the present invention.

The DCO file is the second core feature described herein, and it contains, in essence, all of the information necessary to resurrect or reconstruct the document collection hierarchy, which takes on the appearance of an organizational "tree" 300, as illustrated in FIG. 3. For example, the DCO file contains the information necessary to establish that folder $F_1$ contains two nested folders $F_2$ and $F_3$. In addition, this exemplary DCO file contains the information necessary to establish that there are a number of documents $D_1$, $D_2$, $D_3$ and $D_4$ directly associated with folder $F_1$; that there are two documents $D_3$ and $D_4$ directly associated with folder $F_2$; that there are two documents $D_5$ and $D_6$, as well as a nested folder $F_4$ associated with folder $F_3$; and that folder $F_4$ contains a document $D_4$ and a clipped document S.

In accordance with another aspect of the present invention, each user, in a multiple-user environment, has the ability to create a user profile for a local terminal or workstation. The user profile, in essence, defines a "local" version of the primary document collection and the document collection hierarchy, which are, in turn, defined by the various STG files and the DCO file respectively, as described above. The user profile may define the local document collection such that it includes all of, or a portion of, the documents in the primary document collection. The user profile may also define the local document collection such that it reflects a different document collection hierarchy than the one defined by the DCO file for the primary document collection.

This is accomplished, in part, by maintaining a local STG file for each document in the local document collection. In addition, a local version of the DCO file is maintained, which defines the hierarchy of the documents in the local document collection. Although a user can, of course, alter the content of an existing document in the primary document collection by manipulating the document locally, and hence, the content of the STG file associated with that document, the user profile cannot alter the document collection hierarchy defined by the DCO file for the primary document collection.

VIRTUAL DOCUMENT STORAGE

The present invention also employs a virtual document storage scheme. Virtual document storage is the third core feature described herein.

FIG. 3 illustrates the concept of this virtual document storage feature. It will be recognized that document $D_4$ appears in several folders within the organizational hierarchy 300. First, it is associated with folder $F_1$. Next, it is associated with folder $F_2$. Finally, it is associated with folder $F_4$. However, in accordance with a preferred embodiment of the present invention, this does not mean that three copies of document $D_4$ are stored in the DCO file. On the contrary, the content of document $D_4$, as with each and every document in the document collection, is stored in its entirety in but one memory location, and the DCO file links folders $F_1$, $F_2$ and $F_4$ to the one copy of document $D_4$ by providing a pointer from each folder $F_1$, $F_2$ and $F_4$ to the STG file 310 associated with the document $D_4$.

The virtual document storage feature saves memory space, it simplifies the task of updating files, and it guarantees document integrity by maintaining but one version of a given document, as one skilled in the art will readily understand. For example, if a user modifies an existing document, such as document $D_4$, the modifications are reflected in the affected data fields in the corresponding STG file 310. Consequently, these modifications are reflected whenever the user, at a later time, accesses the document $D_4$ through folder $F_1$, $F_2$ or $F_4$.

INDEXING AND RETRIEVING

In addition to the core features 150 described above, the present invention employs a number of document management utilities. The first of these utilities is the indexing and retrieving utility 157, the focus of which is an index and retrieval engine. The index and retrieval engine, among other things, maintains an indexing database comprising an index or list of each document in the document collection and a cross-reference between each document in the document collection and various key terms and/or document attributes that are stored for each document in the corresponding STG file. The indexing database, in turn, is primarily used to support the document search function, which is described in greater detail below. Briefly, however, the present invention employs a search engine which has the ability to compare the information in the indexing database with one or more user-supplied search terms or attributes. Documents whose indexing information match the user-supplied search terms or attributes are then identified and/or retrieved.

The index and retrieval engine also continuously updates the indexing database. For example, when a new document becomes part of the document collection, an STG file is created for that document, as explained above. In a preferred embodiment, the index and retrieval engine also creates a new entry in the indexing database for the new document, cross-referenced with key terms and other attributes extracted from the new document's STG file.

In addition, the index and retrieval engine continuously monitors the contents of existing STG files. If a document is modified, and if the modification is reflected in the corresponding STG file, the index and retrieval engine updates the indexing database accordingly.

Another related utility is the Universal Resource Locator (URL) indexing module. Essentially, a URL is a World Wide Web site that furnishes information regarding the location and, in some cases, the content of particular Web sites and/or Web documents. The URL indexing module provides the ability to index this information so that a user can more effectively access a Web site or retrieve a particular web document as if it were any other document stored in the document collection.

In the present invention, there are three exemplary embodiments for implementing the URL indexing module. The first exemplary embodiment involves auto-indexing "bookmarks". A bookmark is an entry in a list of commonly used web sites. In accordance with this embodiment, an STG file is created for each bookmark. The second exemplary embodiment involves physically copying a URL into memory, and indexing information relating to that URL. In this embodiment, an STG file is created for the URL. The third exemplary embodiment involves viewing a particular document located at or identified by a particular URL. Again, information relating to this document may be indexed as with any document in the document collection.

Moreover, an STG file is created for the document, and the document can be imported through the Browser utility, which is described below.

CATEGORIES AND CATEGORIZATION OF DOCUMENTS

The present invention also employs a categorization utility 159 that provides different levels of automated assistance in organizing the document collection. A category is a logical grouping of documents that share some common attribute or attributes, sometimes referred to as category criteria. For example, a category may consist of a number of documents that share a common author, a number of documents that contain at least a predefined number of words, a number of documents that contain certain key words, or a number of documents that share a common concept. A more specific example might be a category called "company press releases" or a category called "all e-mails I've sent out". Categories can also be defined hierarchically. In other words, a category may have a subcategory. For example, "all e-mails I've sent out to my group" might be a subcategory of "all e-mails I've sent out".

The categorization utility 159 implements a category by associating a corresponding set of category criteria with a folder in the document collection hierarchy; however, it will be recognized that not every folder in the document collection hierarchy is associated with a category. For example, in FIG. 3, folder $F_2$ is associated with a category as indicated by the symbol "*". However, folders $F_1$, $F_3$ and $F_4$ are not associated with a category.

Folders that are associated with a category are, in general, referred to herein as "smart" folders. They are referred to as smart folders because the categorization utility 159 continuously searches through the STG file directory, or a portion thereof, for documents that match the category criteria associated with each smart folder. If a match is identified, the categorization utility 159 generates a link between the smart folder and the matching document, through the matching document's STG file, thus creating the appearance that smart folders automatically collect matching documents without user interaction.

As stated, the categorization utility 159 may only search a portion of the STG directory for documents that match the category criteria of a given smart folder. In an exemplary embodiment of the present invention, the categorization utility 159 limits its search of the STG directory to only those STG files associated with documents that are linked to the smart folder's parent folder. For example, in FIG. 3, $F_2$ is a smart folder. In accordance with this exemplary embodiment, the categorization utility 159 searches the STG files associated with $F_1$, wherein $F_1$ is the parent folder of $F_2$. Accordingly, the categorization utility 159 only searches through the STG files associated with the documents $D_1$, $D_2$, $D_3$ and $D_4$. At present, only the documents $D_3$ and $D_4$ match the category criteria associated with the smart folder $F_2$.

Generating a link between a document and a smart folder may occur after an STG file is created for a new document, or it may occur after an existing STG file has been updated due to the modification of its corresponding document, wherein the modification caused the document to meet the category criteria of the smart folder. Similarly, if a document is modified such that the modification causes the document to no longer meet the category criteria of a particular smart folder, the link between that document's STG file and the smart folder may be eliminated.

In accordance with a preferred embodiment of the present invention, the categorization utility 159 categorizes documents under various smart folders using one of three possible categorization methods: auto categorization; semi-automatic categorization; or manual categorization.

With manual categorization, a document, through its corresponding STG file, is linked with a particular category, hence a particular folder, when a user physically "drags and drops" a display screen representation of the document onto a display screen representation of the folder. As the categorization utility 159 did not previously nor automatically categorize the document with this folder, the folder is either not a smart folder or it is an inactive smart folder, or the folder is an active smart folder, but the document does not otherwise match the corresponding category criteria. Active versus inactive smart folders are explained in more detail below.

Semi-automatic categorization involves categorizing a document into any one or more categories with minimal user interaction. Here, the user constructs category criteria in the form of a query. The query, in turn, comprises one or more key terms and/or document attributes which define the category. The user may also restrict the scope of the query, for example, to particular directories or document types. The category criteria are then associated with a folder, i.e., a smart folder, and the categorization utility 159 continuously searches through all or a portion of the STG files for documents that have attributes matching the category criteria. If a matching document is identified, a new link is established between the corresponding smart folder and the matching document through the document's STG file.

Automatic categorization involves categorizing a document into one or more categories without any user interaction. Here, each category is represented by a smart folder that initially contains a "seed" document. The "seed" document is then analyzed by the categorization utility 159, and the category criteria (i.e., the key words and/or attributes) are automatically extracted. Existing documents and new documents that match the automatically extracted category criteria are linked with the smart folder through their corresponding STG files.

The categorization utility 159 can utilize the indexing information to examine the relationship between the various documents within a particular category. This feature scores or ranks the relationships. For example, documents that share a large number of key terms are considered closely related; those that do not share a large number of key terms are considered less related. The categorization utility 159 can display the results in the form of an organization hierarchy "tree". Branching high in the organizational hierarchy denotes a close relationship, while branching low in the hierarchy denotes a more distant relationship.

In a preferred embodiment, a user can modify the category criteria associated with a smart folder. This is accomplished through a "modify category criteria" user interface. Changing category criteria may result in the categorization utility 159 purging documents from the corresponding category if the documents no longer match the category criteria. In addition, the categorization utility 159 initiates a search using the modified category criteria, to identify additional documents in the document collection that are now relevant given the new category criteria.

In a preferred embodiment of the present invention, a user may designate a smart folder as active or non-active. For each active smart folder, the categorization utility 159 continuously searches the STG file directory, as described above, for documents that match the category criteria associated with each of the smart folders. For inactive smart folders, the categorization utility 159 does not continuously search the STG file directory for documents that match the category criteria of the various inactive smart folders; however, a user is able manually categorize a document with a non-active smart folder. Active smart folders are sometimes referred to as "hungry" folders.

Smart folders can also be reactive. In accordance with a preferred embodiment of the present invention, a user can program a smart folder with particular behavioral characteristics, such that a particular task or tasks are automatically performed on or with the documents linked with that smart folder. For example, the user may program a smart folder to automatically e-mail all documents stored therein to a particular e-mail address. In another example, the user may program a smart folder to periodically display folder updates, such as the addition or deletion of new documents.

With respect to semi-automatic and automatic categorization, there are two filter types associated with each smart folder. The first filter type generates an inclusion list. The inclusion list identifies those documents that were not automatically included in the category associated with the smart folder during the categorization process. The inclusion list may provide the user with an indication that the category criteria associated with that category are too restrictive. The second filter type generates an exclusion list. The exclusion list identifies those documents that were not automatically excluded from the category associated with the smart folder during the categorization process. The exclusion list may provide the user with an indication that the category criteria associated with that category are not restrictive enough (i.e., the category criteria is too aggressive). Both lists are manually manipulated by the user. Accordingly, the user can modify the two lists as needed.

As explained above, the data defining the links that are established between the various smart folders and the documents in the document collection are maintained in the DCO file. If a user modifies the contents of a document and that modification causes a change in the link or links between that document, through its corresponding STG file, and one or more smart folders, a change notification utility (not shown in FIG. 1B) updates the DCO file to reflect the changes accordingly. More specifically, the change notification utility modifies the DCO file to reflect the newly created links and/or the deletion of links. The change notification utility also updates the thumbnail representations if needed. And if the user deletes a document in its entirety, the change notification utility deletes all of the links associated with that document from the DCO file.

Figure 4:
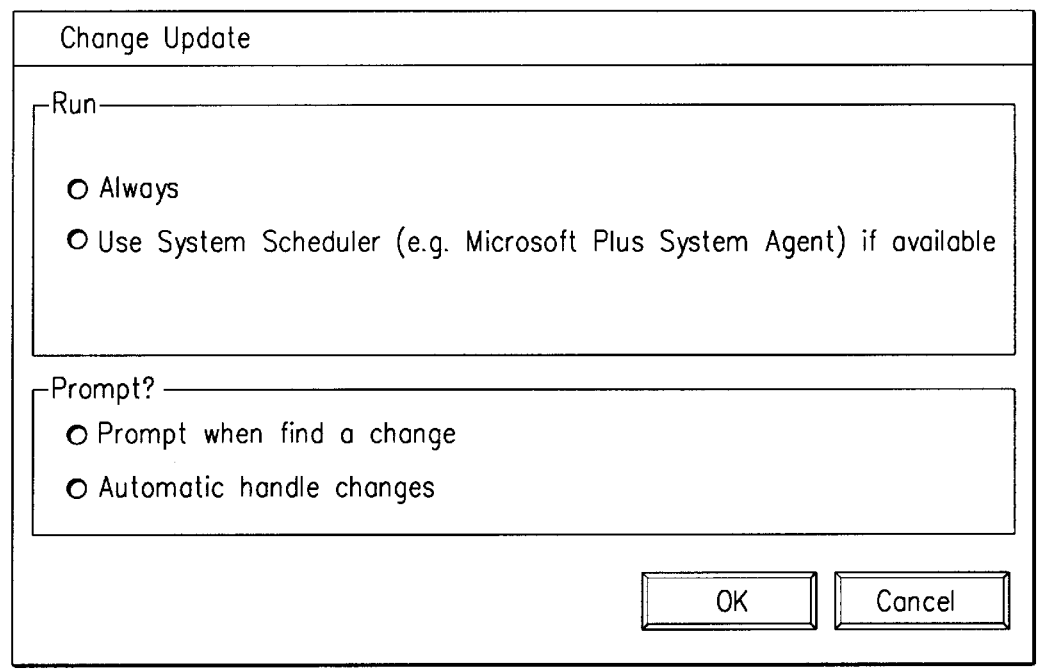
FIG. 4 is a screen display of the user interface associated with the change notification utility.

The user interface for the change notification utility is illustrated in FIG. 4. This user interface allows the user to select a few preferences with respect to the change notification utility. More particularly, the user can select how often the utility is to perform the updates, as well as the type of file changes that triggers an update notification.

IMPORTING DOCUMENTS

The present invention also employs a document importing utility 161. The document importing utility permits the present invention to import electronic documents or electronic representation of paper-based documents from various sources. For example, the document importing utility 161, as shown in FIG. 1A, can import documents from a scanner, from an external memory such as a hard drive, from a LAN, or from the internet.

The first feature associated with the document importing utility 161 is the scanner module. The scanner module controls a scanner connected to the host computer system. More specifically, the scanner module allows the user to set-up the scanner. It also controls the scanning process and the process of saving the electronic representation of the document being scanned.

Figure 7:
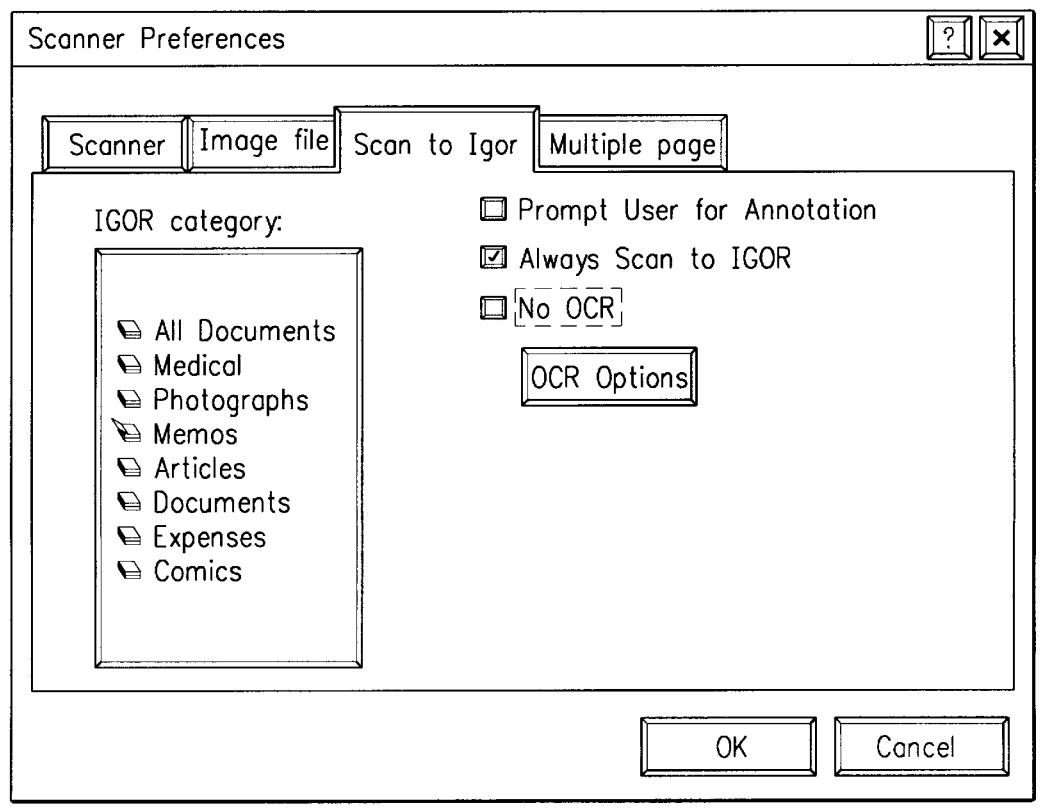
FIG. 7 is a screen display of a third scanner preferences user interface.
Figure 5:
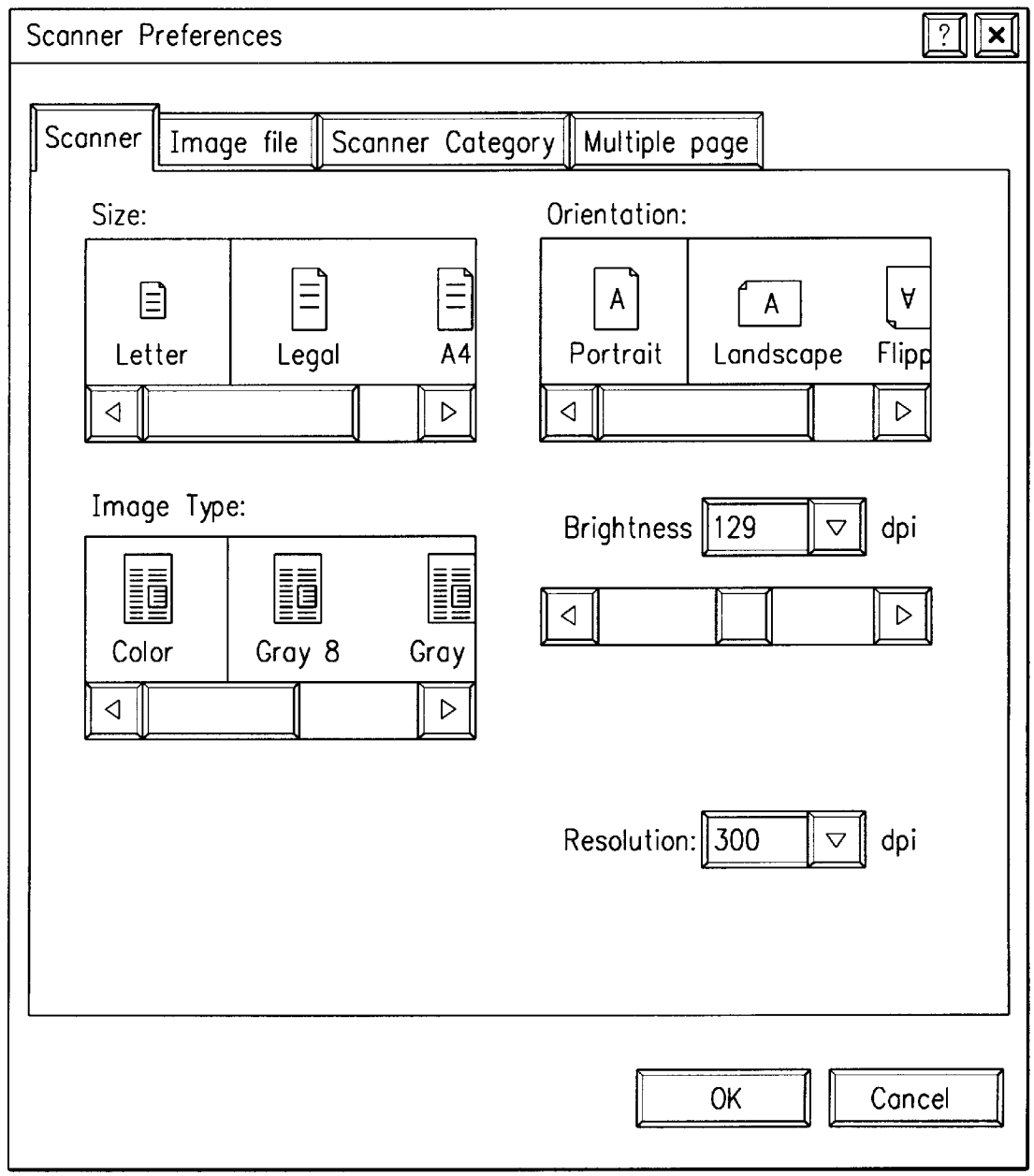
FIG. 5 is a screen display of a first scanner preferences user interface.
Figure 6:
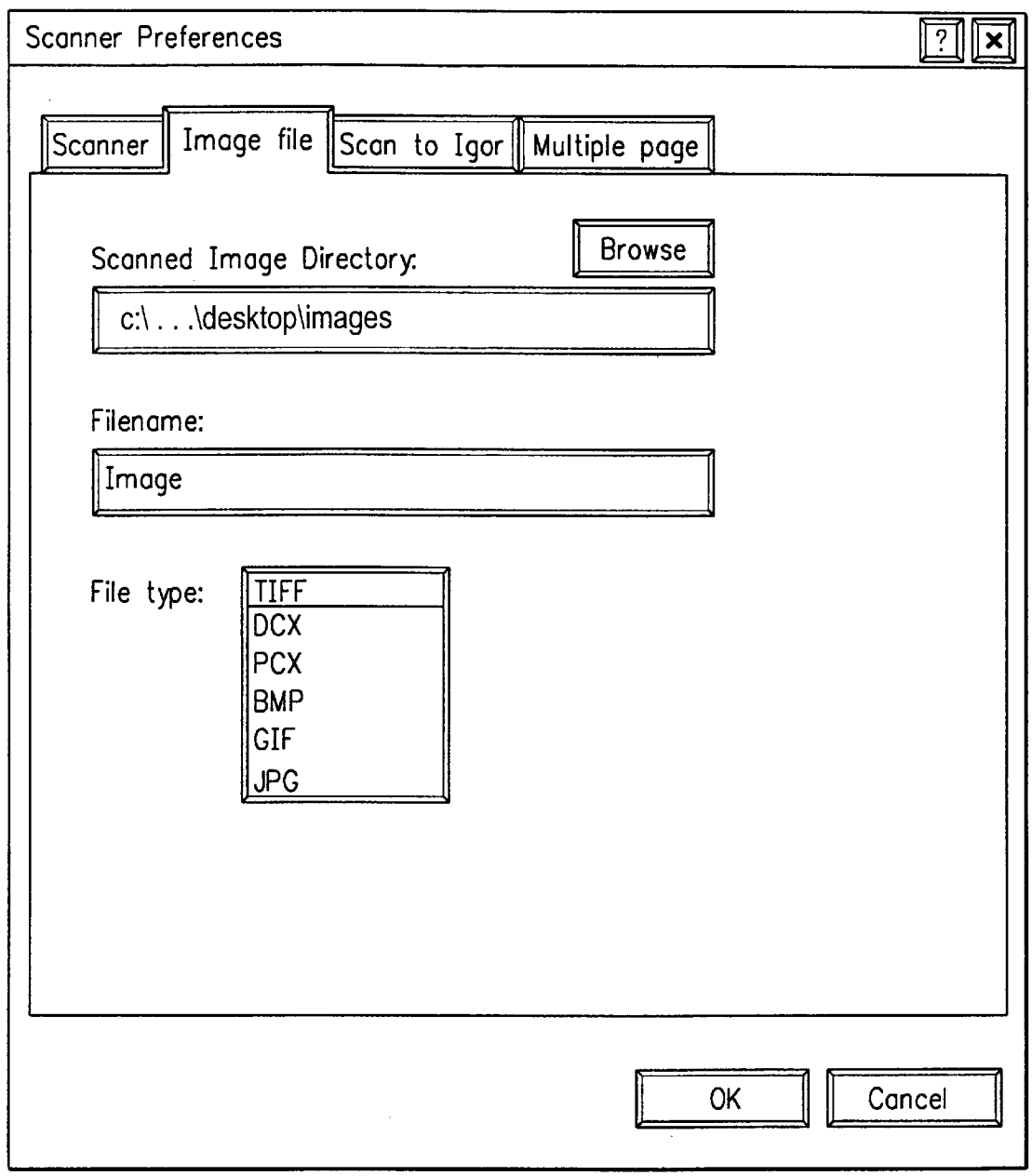
FIG. 6 is a screen display of a second scanner preferences user interface.

In a preferred embodiment of the present invention, there are a number of user interfaces associated with the scanner module. The first user interface is the scanner preferences interface, and there are four display options associated with the scanner preferences interface. The first display option allows the user to define various scanner options, as illustrated in FIG. 5. The second display option is for defining image file options, as illustrated in FIG. 6. The third display is for setting-up scan-to-category options, as illustrated in FIG. 7. This option permits the user to scan a document directly into a desired category. The fourth is for defining options with respect to multiple page documents, as illustrated in FIG. 8.

Figure 8:
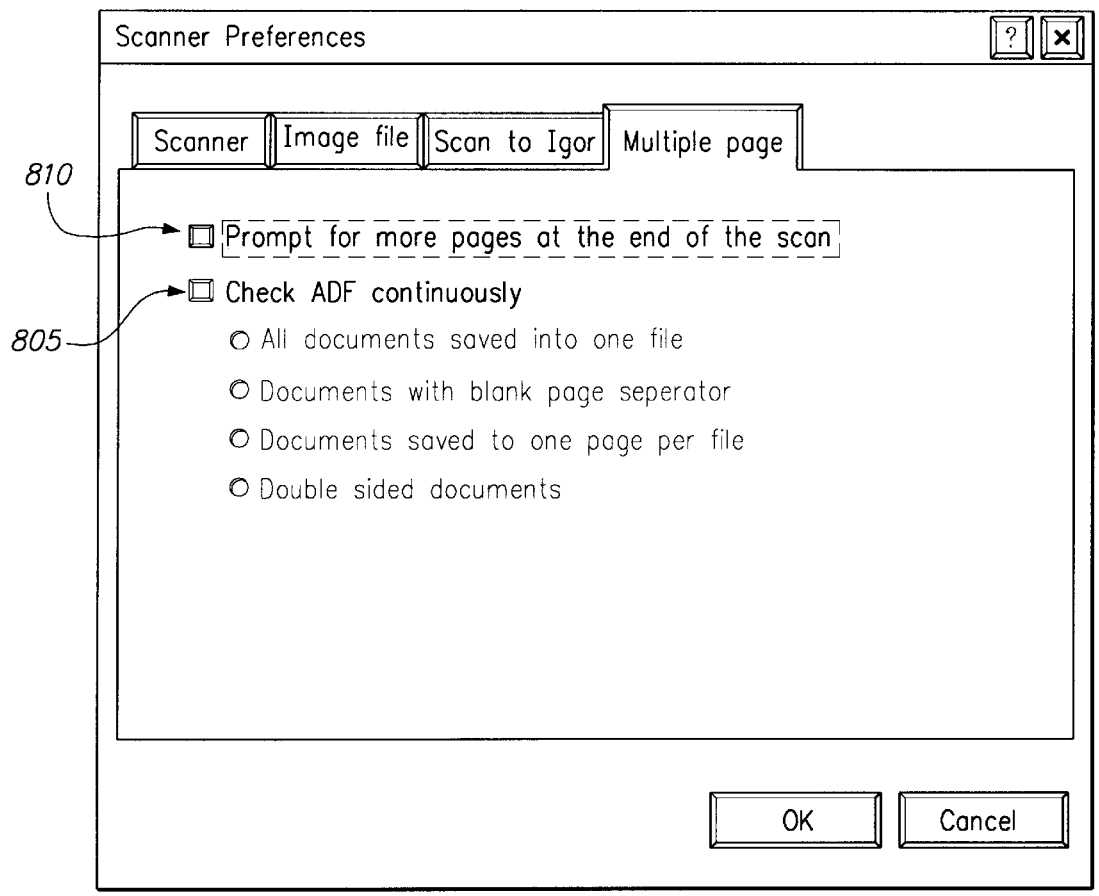
FIG. 8 is a screen display of a fourth scanner preferences user interface.

With particular regard to the multiple page option interface illustrated in FIG. 8, this set of user-defined options is for controlling the scanner's automatic document feeder (ADF). Of course, this particular scanner preference option is enabled only if the scanner has an ADF. If the user selects the "Check ADF continuously" box 805, the scanner is polled at a predefined interval to determine whether there is paper in the ADF waiting to be scanned. If there is paper in the ADF, it is scanned, and the document is saved according to the other above-identified scanner preference options. If there is more than one page being scanned, there are a number of additional options as illustrated in FIG. 8. If the user selects the "prompt for more pages at the end of the scan" box 810, the user will be prompted to append additional pages to the document at the end of the current scanning operation.

Figure 9:
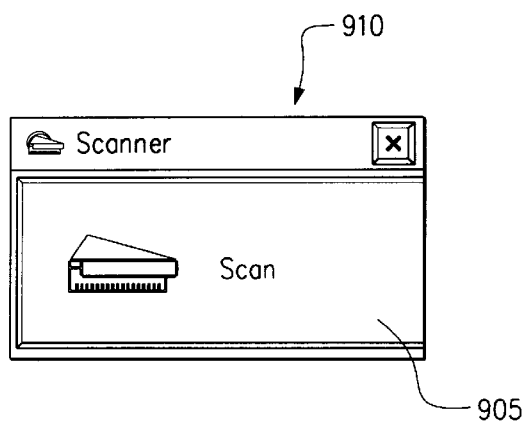
FIG. 9 is a screen display of the scanner control interface.

The second user interface associated with the scanner module is the scanner control interface. The scanner control interface is illustrated in FIG. 9. When the scan button 905 in the center of the scanner control interface is selected, the scanner module begins scanning a document in accordance with the scanner preference options described above. If the user selects the scanner control interface title bar 910, the scanner preferences interface described above is be displayed, thus allowing the user to accept or change the current scanner preference options.

As previously stated, an STG file is created for each new document in the document collection. In addition, the index and retrieval engine indexes each new document based on the attribute data in the corresponding STG file, and the categorization utility 159 links each new document with the appropriate smart folders. Each of these features holds true for new documents that have been scanned into the document collection as well as those which have entered the document collection via other mechanisms. This saves the user from having to physically interact with a particular document or documents after they have been scanned.

Figure 10:
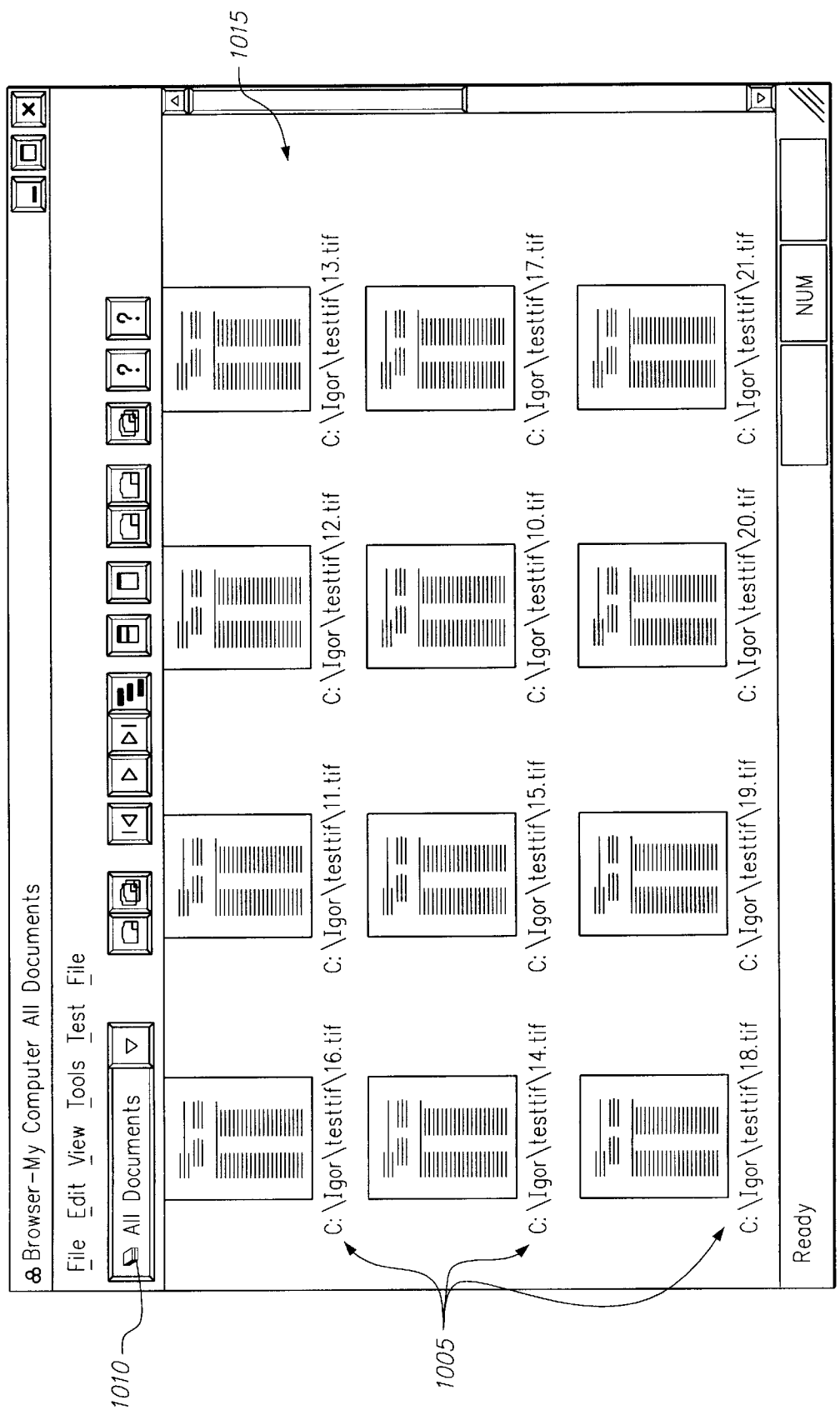
FIG. 10 is a screen display of a first Browser utility user interface.

The second feature associated with the document importing utility 161 is the file import module. The file import module is responsible for extracting and saving attribute information in the STG file of a newly imported document. The attribute information extracted from each document by the file import module depends, to some extent, upon the file type. With regard to word processing type documents, the file import module extracts and saves the raw text information. The file import module also extracts a 96×96 pixel map for generating a thumbnail image of the first page of each document. Thumbnails contain actual document information, and are primarily used in conjunction with the Browser utility to help a user quickly identify specific files. FIG. 10 illustrates an exemplary display from the Browser utility which contains a number of thumbnail representations

1005 for the category entitled "My Documents" as indicated in text box 1010. For image files, the file import module extracts a thumbnail map and any meta-text associated with the image file. Meta-text contains the content and position information for any alpha-numeric information appearing in the image. The file import module then converts the alpha-numeric information into plain text. The plain text can then be used by the index and retrieval engine as described above. Therefore, image files can be indexed and categorized just like word processing and other text files.

When a color image containing text is to be scanned, the user can specify that the color image is to be scanned using a two-pass scanning process. The first pass is a low resolution scan which converts the document into a desired image format, e.g., TIFF, JPEG etc. . . . The second pass is a higher resolution pass that is conducted on a non-color or non-gray scale version of the image. This second scanning pass is used to obtain the position of the meta-text described above.

The third feature associated with the document importing utility 161 is the failed import recovery feature. If, upon importing a document into the document collection, the file import module is unable to determine the document format, the user is prompted to define the format.

BROWSING DOCUMENTS

The present invention includes a document browsing utility 163. The Browser utility 163 permits the user to quickly and efficiently review the document collection or a portion thereof. Moreover, it allows the user to view the documents and the document categories as they are logically arranged in the organizational tree described above. In addition, the Browser utility 163 permits the user to manipulate documents and document categories; to copy, move and delete documents and document categories; to view and print documents; and to bundle multiple documents into a compound document entity referred to as a clipped document. Clipped documents are described in greater detail below.

Figure 11:
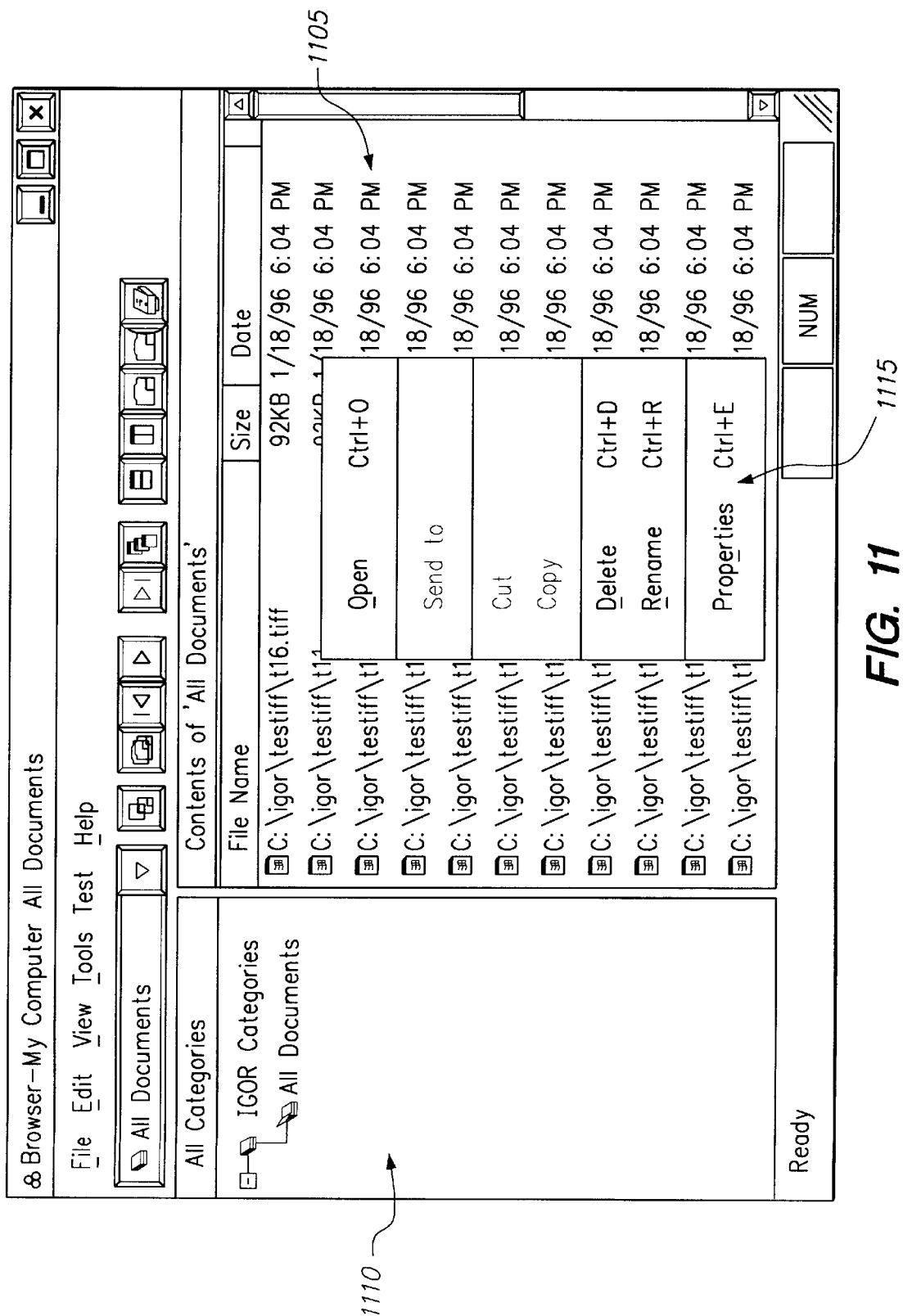
FIG. 11 is a screen display of a second Browser utility user interface.

There are two basic user interfaces associated with the Browser utility 163. The first is referred to as My Computer, as illustrated in FIG. 10. When viewing documents and document categories with the My Computer interface, there is one display panel 1015 for displaying a representation of each document, clipped document or folder. In FIG. 10, the document representations are displayed as thumbnails, although other representations are available such as small or large icons. The second user interface is referred to as the Explorer interface, as illustrated in FIG. 11. In contrast, Explorer has two display panels: a right display panel 1105 and a left display panel 1110. While the left panel 1110 displays the folders and/or document categories, including the one currently opened, the right panel 1105 displays a representation of each document, clipped document and/or folder associated with the currently opened folder or document category. Again, the representations appearing in the right panel 1105 can take the form of thumbnails, small icons, or large icons. In FIG. 11, the representations are in the form of small icons.

The Browser utility 163 allows the user to interact with the documents in the document collection in a number of different ways. Using a mouse or cursor, the user can open documents in a corresponding host application. The user can open a category and display the documents, clipped documents, folders and/or subcategories associated therewith. The user can open a context menu 1115 for a given document, as shown in FIG. 11, wherein the context menu 1115 provides the user with a number of additional options as illustrated.

These two user interfaces associated with the Browser utility 163, My Computer, as illustrated in FIG. 10, and Explorer, as illustrated in FIG. 11, each have a number of standard pull-down menus. The FILE pull-down menu, for example, allows the user to, among other options, open documents, clipped documents, or document categories; send documents or clipped documents as e-mail messages; create new categories; import new documents from the scanner; delete, rename and/or list the properties of documents, clipped documents and categories. The EDIT menu allows the user to copy, paste, select all or part of a document. This menu also allows the user to clip or unclip documents. The VIEW menu, among other options, allows the user to display a customizable application toolbar, to be described below, and to control the arrangement and display representation of each document. In addition, there is also a TOOLS, TEST and a HELP menu.

In order to import a document into the system's document collection from the Browser utility 163, a user can exercise one of several options. For example, a user can drag a document from the computer operating system desktop environment and drop it onto a Browser utility icon also appearing on the desktop. If one of the two above-identified Browser utility interfaces is active, the user can drag a document from the desktop environment and drop it into one of the aforementioned panels in a location that is unoccupied by another icon or thumbnail. As described above, the categorization utility 159 automatically categorizes these documents based on the document attributes extracted and then stored in their corresponding STG files. The user can also drag a document from the desktop environment into a particular category representation appearing in the Browser interface, thus, manually categorizing the document. Finally, the user can cut and paste all or part of a document, or the user can scan in a document.

The user can also initiate a scanning operation from the Browser utility 163. A representation of the scanned image can be displayed on the desktop or scanned directly into one or more categories based on the user specified scanner options described above. This too is handled by a task manager utility 165 which is described in greater detail below.

Figure 12:
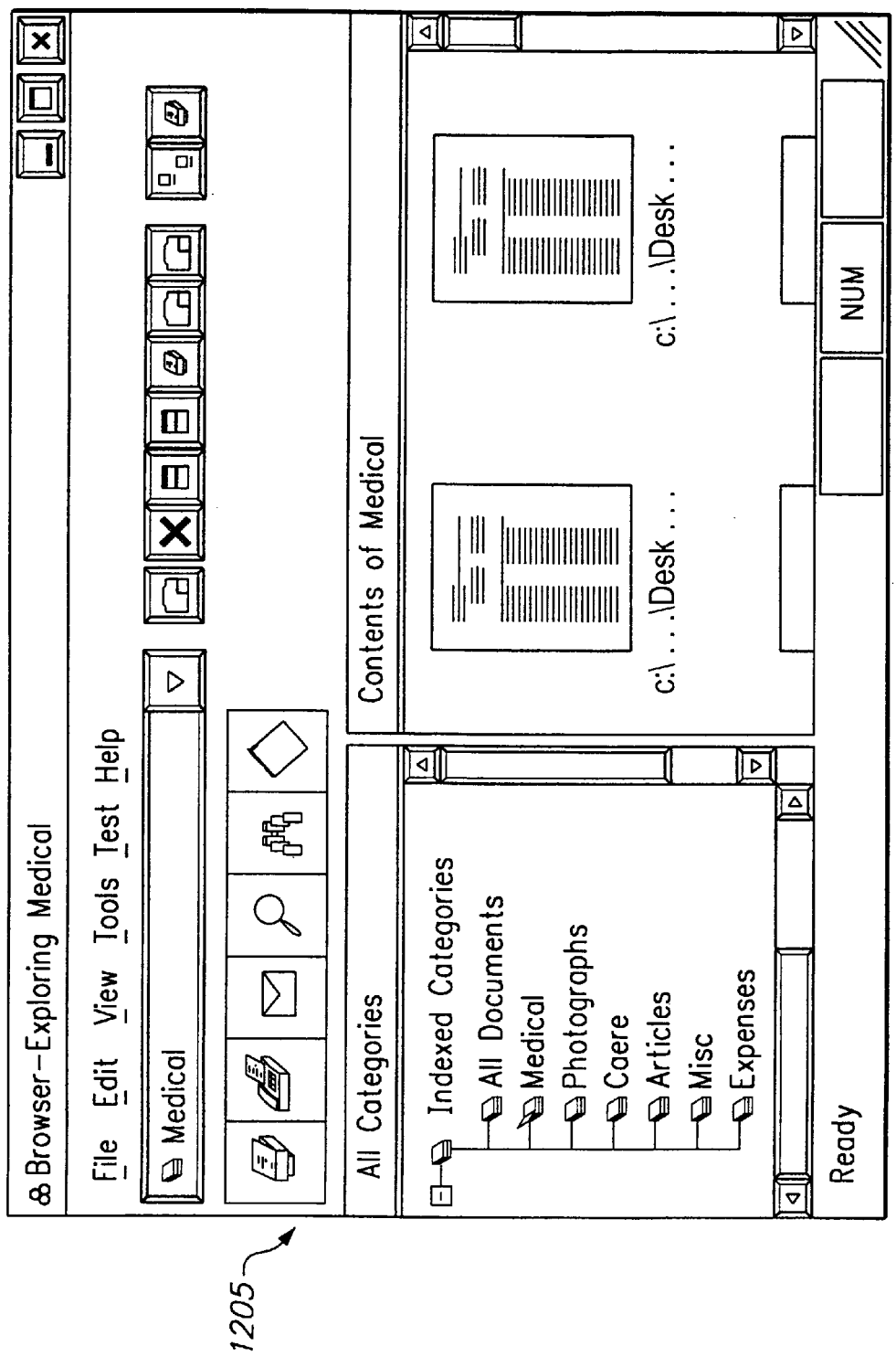
FIG. 12 is a screen display of the second Browser utility user interface with a customizable application toolbar.

The user may also opt to display the customizable application toolbar, mentioned above, with either of the two Browser interfaces. An exemplary toolbar 1205 is illustrated in FIG. 12. The toolbar 1205 makes it easier for the user to directly interact with documents maintained in the document collection. For example, by employing the toolbar 1205, the user is able to drag and drop application program icons or buttons (i.e., buttons or icons which, if selected, launch an application program such as Microsoft Excel, Microsoft Word, Netscape, or Wordperfect), thus allowing the user to quickly open one or more application programs and to convert, view and/or edit documents on-the-fly. This on-the-fly document conversion is accomplished by employing conversion filters to convert the various file formats. As stated, the user is able to quickly execute other functions with the customizable application toolbar, such as send e-mail, transmit facsimiles, and initiate print jobs.

Figure 13:
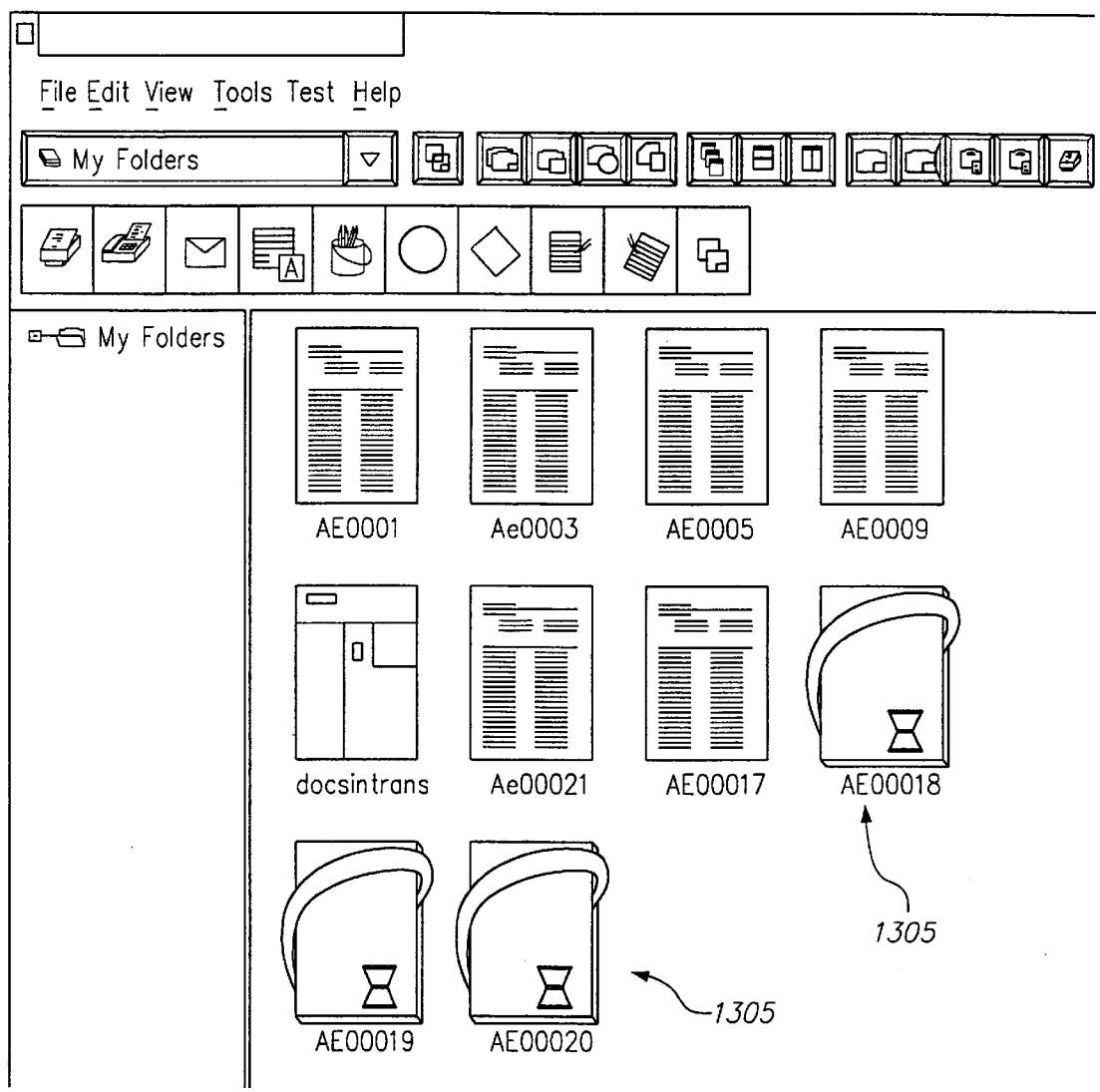
FIG. 13 is a screen display of a third Browser utility user interface containing icons representing transitional documents.

The Browser utility 163 is also capable of displaying a representation for one or more transitional documents. A transitional document is a document that is currently being processed by the importing utility 161. During the period in which a document is being processed by the importing utility 161, the Browser utility 163 displays an "in-transition" icon for that document, for example, the in-transition icons 1305 shown in FIG. 13. However, an in-transition icon is a temporary representation. When the importing utility 161 finishes processing the document, the Browser utility 163 automatically replaces the in-transition icon with the appropriate thumbnail representation, a small icon or a large icon, depending upon the current Browser utility display settings described above. In-transition icons provide the user with an easily recognizable representation for each of the one or more transitional documents.

SEARCHING DOCUMENTS

The present invention also includes a document searching utility 167. The searching utility 167, in turn, employs a search engine that globally searches the document collection (i.e., the STG files in the STG file directory) and retrieves documents that fit or match a number of user-defined conditions with respect to text, meta-text, and/or other file attributes (e.g., document author, date, size, format).

In a preferred embodiment of the present invention, there are two search types which the user can initiate: a basic search and an advanced search. The basic search allows the user to search the document collection using a search query that contains only words or phrases. The advanced search allows the user to build a query that contains words and/or phrases as well as other file attributes, and it allows the user to combine the various words, phrases and other file attributes with boolean operators.

Whether the user invokes a basic search or an advanced search, the searching procedure is essentially the same. The user enters a desired query, then selects a FIND NOW option in the corresponding user interface, which is described in greater detail below. The results are then displayed. The user then selects one or more of the identified documents, if desired.

Figure 14:
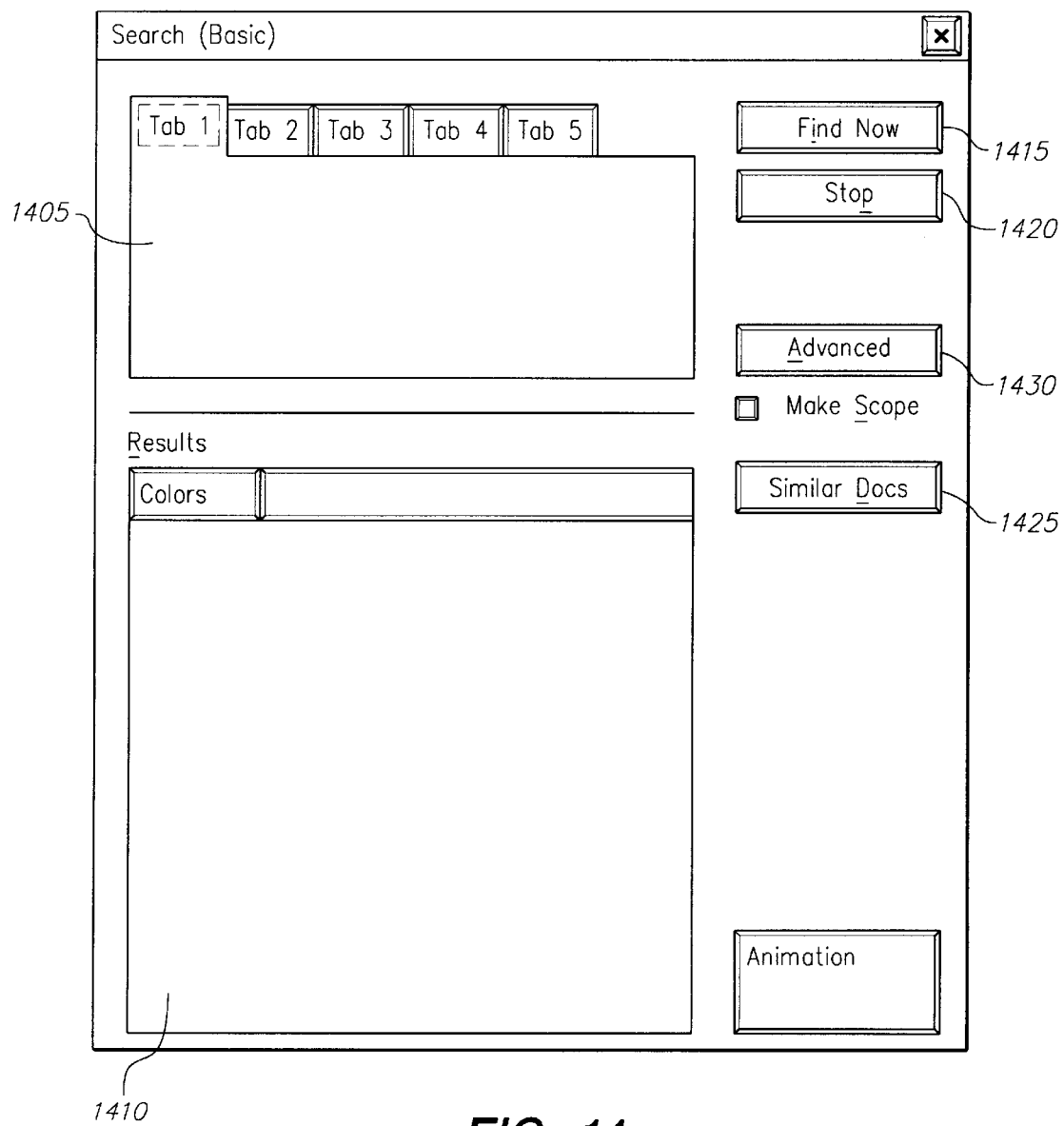
FIG. 14 illustrates the user interface for conducting a basic document search.

As stated, there is a user interface for the basic search and a user interface for the advanced search. The user interface for the basic search is illustrated in FIG. 14. As shown in FIG. 14, the user interface is divided into an upper portion 1405, which is reserved for building search queries, and a lower portion 1410, where the results of a given search are displayed. The lower portion 1410 is referred to as the results listbox.

After the user builds a basic search query, the user selects the FIND NOW option 1415 on the user interface to initiate the search. The search engine then performs the search for that query. As the indexing engine finds a document that matches the search criteria defined by the search query, the indexing engines informs the search utility 167. The search utility 167, in turn, displays the name of the document in the results listbox 1410 of the basic search user interface. At any time during the search, the user can select the STOP option 1420 on the user interface, which forces the indexing engine to terminate the search.

With regard to the results listbox 1410, the user can view the identified documents as small icons, large icons, thumbnails, or as a detailed list of documents. In an exemplary embodiment, the search utility 167 creates one or more smart folders and displays them in the results listbox 1410. Each of the one or more smart folders has category criteria associated with a particular level of relevance (e.g., a number of search hits). Documents identified during the search are linked to one of these smart folders depending upon the actual relevancy of the document. For example, the search utility 167 may create two smart folders. The first smart folder's category criteria may be documents identified during the search operation having 10 or more search hits. In contrast, the second smart folder's category criteria may be documents identified during the search having less than 10 search hits. The search utility 167 then links the documents identified during the search to either the first or the second smart folder accordingly. The smart folders, along with the documents linked thereto are then displayed in the results listbox 1410. In another example, the search operation may create a number of smart folders which are displayed in the listbox 1410, wherein each smart folder may be linked to a group of documents that share a certain number of key search terms. Alternatively, each smart folder may be linked to a group of documents containing key search terms that exhibit a certain semantic similarity.

In accordance with another exemplary embodiment, the search operation may identify one or more existing categories whose category criteria, in whole or in part, overlaps the key search query criteria. The search results might then be organized such that the one or more existing categories are listed. The user could then view those documents associated with each category that meet the search query criteria.

The user can also select any number of retrieved documents, and then select the SIMILAR DOCS 1425 option on the basic search user interface. The search utility 167 then queries the indexing engine to identify all documents similar to those selected. For example, the indexing engine might identify all documents that are similarly categorized. The newly identified documents are then displayed in the results listbox 1410.

Figure 15:
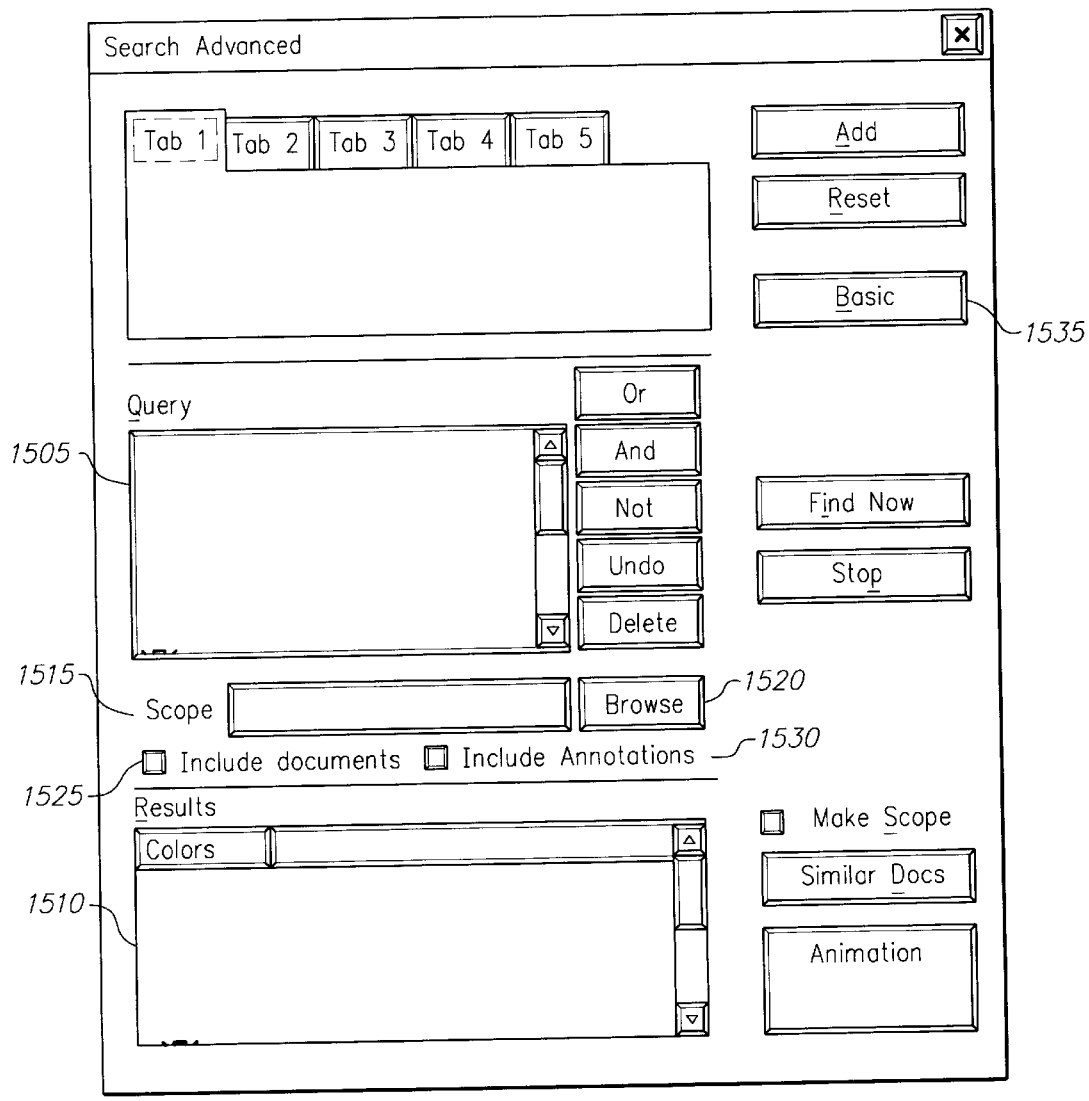
FIG. 15 illustrates the user interface for conducting an advanced document search.

The advanced search user interface is accessed through the basic search user interface by selecting the ADVANCED option 1430. The advanced search user interface is illustrated in FIG. 15. As stated above, the primary difference between a basic search and an advanced search is that with an advanced search, the user can conduct more sophisticated searches with words, phrases, file attributes and/or a combination thereof using boolean operators. A file attribute refers to any number of file characteristics, for example, document size, publication date, author, or document source (i.e., files with a particular extension such as *.TIF, *.TXT, *.HTM).

Although the advanced search user interface, like the basic search user interface, includes an upper portion 1505 for building search queries, and a lower portion 1510 for displaying search results, the advanced search user interface also includes a number of additional options not available for basic searching. For example, the user can modify the scope of an advanced search by entering a specific category in the SCOPE EDIT BOX 1515. By selecting the BROWSE option 1520, a category tree is displayed, which allows the user to select, therefrom, a category for limiting the scope of the advanced search. Accordingly, the selected category is displayed in the SCOPE EDIT BOX 1515. The user can also limit the scope of an advanced search to the contents of each document, excluding document annotations; or the user can include the annotations; or the user can limit the search to only document annotations. This is accomplished by selecting the box 1525 entitled "Include Documents" and/or the box 1530 entitled "Include Annotations". Finally, the user can return to the basic search user interface by selecting the BASIC option 1535. If the user selects this option, all search conditions are lost except those containing exclusively words and/or phrases.

VIEWING DOCUMENTS

The next utility employed by the present invention is the document viewing utility 169. The document viewing utility 169 allows the user to view an entire document regardless of document type or document format, even if the corresponding host application cannot be launched.

Figure 16:
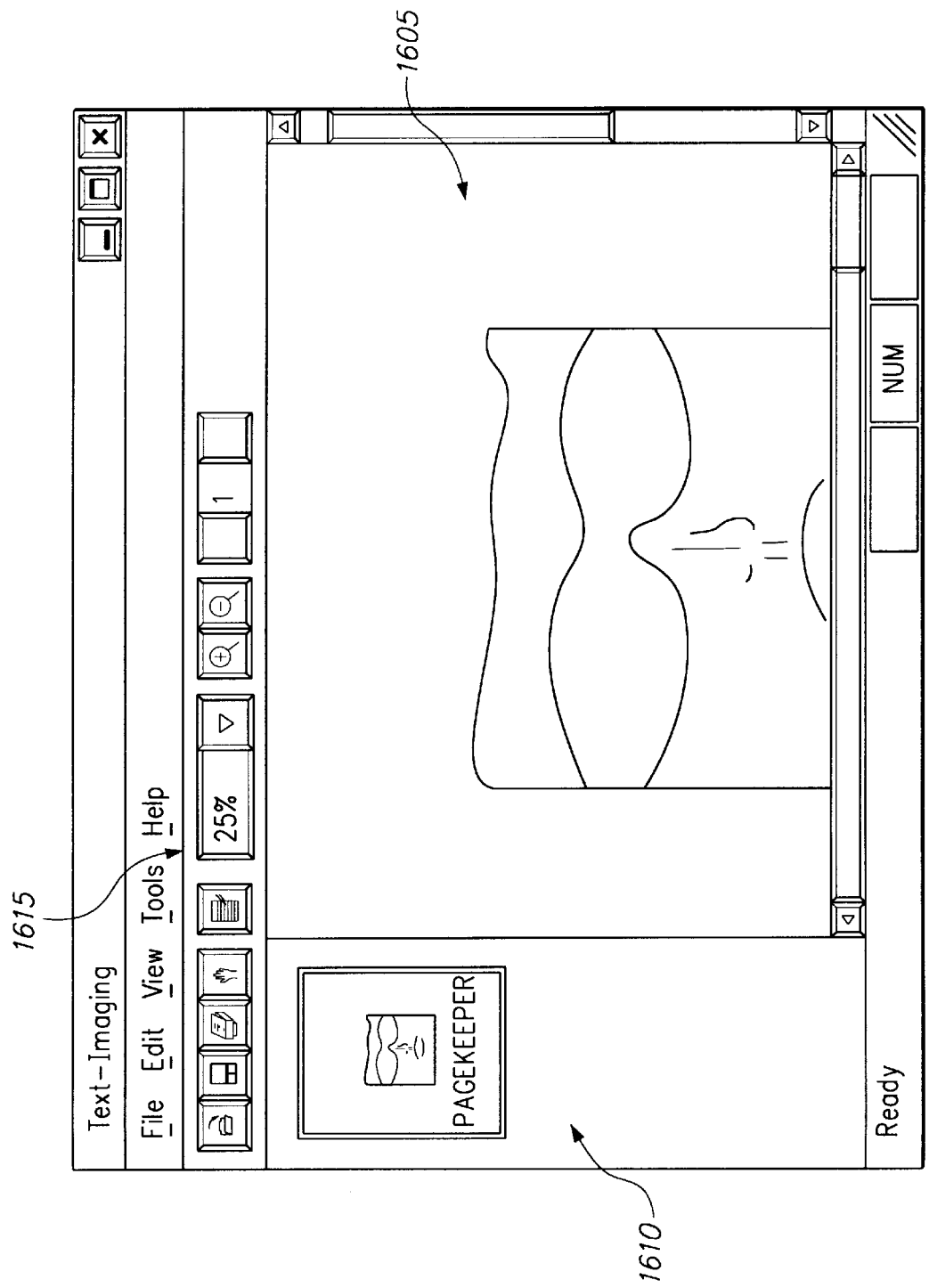
FIG. 16 is a screen display of the document viewing utility user interface.
Figure 17:
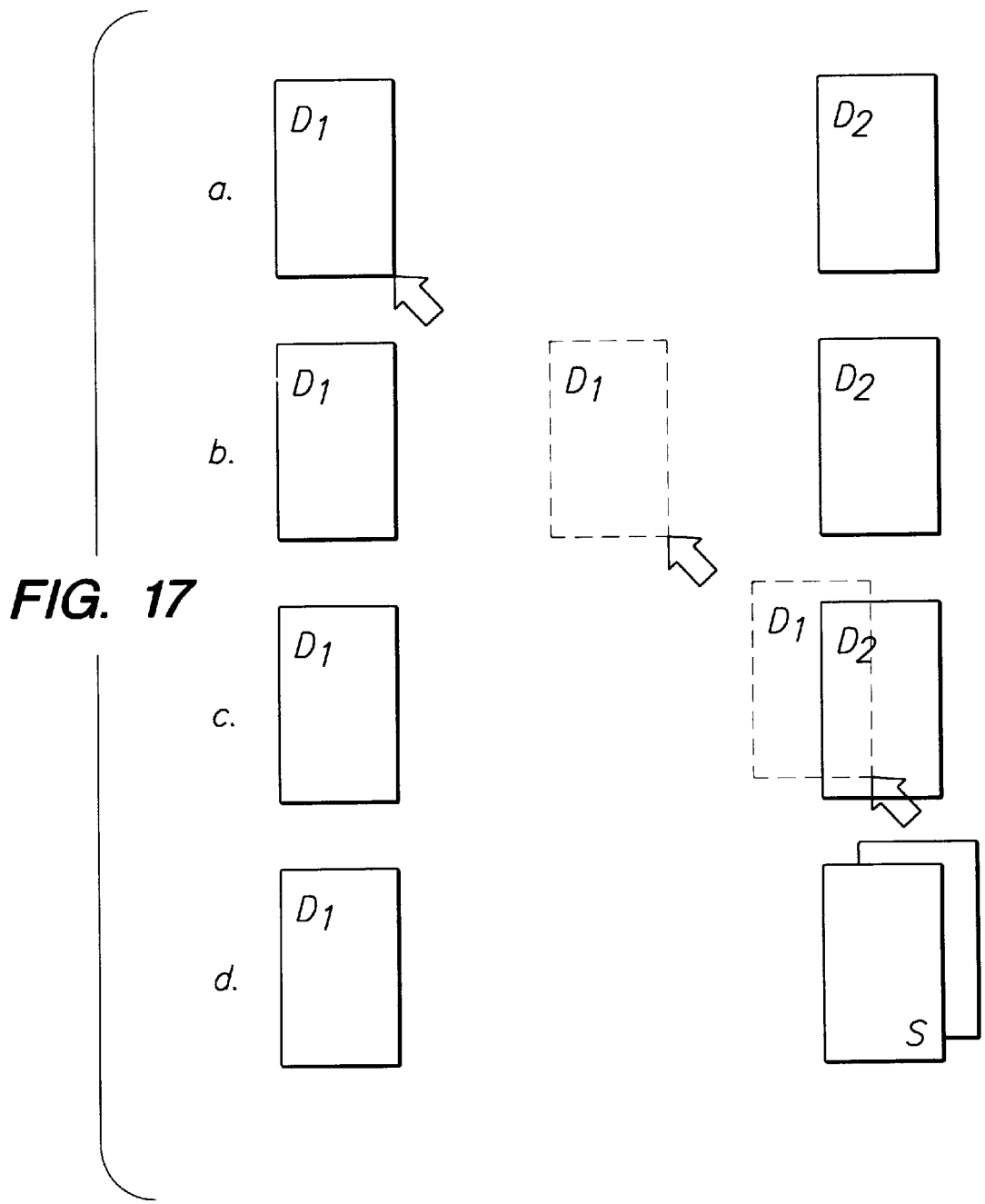
FIGS. 17A–D illustrate a drag and drop operation in conjunction with the creation of a clipped document.

The document viewing utility 169 user interface, as illustrated in FIG. 16, is accessed through the Browser utility 163. The document viewing user interface comprises two panes, a right pane 1605 and a left pane 1610, as illustrated in FIG. 16. The left pane 1610 displays an icon or thumbnail of the document that is being viewed in the right pane 1605. In a preferred embodiment, a thumbnail representation is used if the document is an image. If, instead of a document, a clipped document is being viewed, then the icons or thumbnails for each individual document associated with the clipped document is displayed in the left pane 1610.

The document viewing user interface, like the browser user interfaces, includes a customizable application toolbar 1615 as illustrated in FIG. 16. Again, the toolbar 1615 is customizable in that the user can drag and drop functional buttons into the toolbar 1615 as described above, particularly buttons that, when selected, launch an application program which the user may need to properly view the documents. In addition, the toolbar 1615 may contain a number of functional buttons. In FIG. 16, the toolbar 1615 includes, from left to right, buttons for opening, saving, printing, hand scrolling, annotating, zooming, and advancing forward or back one page of the document being viewed.

The document viewing utility 169 also highlights category criteria. In other words, it highlights the various key words, phrases, and/or attributes in the document being viewed, which make up the category criteria, assuming, of course, the document has been categorized.

CLIPPED DOCUMENTS

The present invention also utilizes a document clipping utility 171. This utility allows a user to combine several documents into a compound document entity herein referred to as a clipped document. More specifically, a clipped document is a form of compound document that contains zero or more documents of any type or format. For example, a clipped document may contain an image document, a Microsoft Word document, a Wordperfect document and a web page in HTML format.

Clipped documents are different from ordinary file folders. First, clipped documents maintain the order in which each component document appears. In other words, each of the component documents that are associated with a clipped document maintains a relative position within the clipped document with respect to the other component documents. Second, clipped documents provide the user with the ability to quickly and simply manipulate a set of related documents as a group. For example, a user can e-mail a clipped document to another user, and the other user actually receives the documents as a clipped document. If the host computer being operated by the other user is not executing the present invention, the other user receives each of the documents individually.

Although the user can manipulate the component documents as a group, there are other instances when the component documents associated with a clipped document are manipulated individually. For example, the search engine, in performing a basic or advanced search, identifies each component document within a clipped document, assuming they meet the search criteria, including the level of relevance of each individual component document.

As explained above, the present invention employs a virtual document storage feature. Accordingly, clipped documents do not physically contain a copy of each component document. Rather, each clipped document has a corresponding STG file, as described above, and as illustrated in FIG. 2B. The STG file associated with a clipped document contains a link to the STG file of each component document (see FIG. 2A). Once again, this virtual document storage feature saves valuable memory space and it helps maintain document integrity (i.e., a single, up-to-date version of each document).

Just as individual documents can belong to more than one category, clipped documents can belong to more than one category. A clipped document can also belong to no categories.

In a preferred embodiment, there are six ways in which a user can create a clipped document. First, from the Browser utility 163, a user can drag the representation of a source document $D_1$ and drop it onto the representation of a destination document $D_2$, as illustrated in FIGS. 17A–17D. The Browser utility 163 creates a new clipped document S in the category containing the destination document $D_2$. A representation of the new clipped document S then appears to subsume the representation of the destination document $D_2$. At the same time, the source document $D_1$ remains in the source category or be removed from the source category depending upon whether the user executes a copy operation or move operation.

Second, from the Browser utility 163, a user can drag the representation of an existing clipped document and drop it onto a destination document. The Browser utility 163 causes the destination document to become concatenated with the clipped document, which in turn appears to subsume the representation of the destination document. A representation of a new clipped document, once again, appears in the category containing the destination document. Also, the existing clipped document remains in or is removed from the source category depending upon whether the user executes a copy operation or a move operation.

Third, from the Browser utility 163, a user can drag the representation of a source document and drop it onto the representation of an existing clipped document in a destination category. Here, the source document is appended to the existing clipped document in the destination category. Again, the source document remains in or is removed from the source category depending upon whether the user executes a copy operation or a move operation.

Fourth, from the Browser utility 163, a user can drag the representation of a clipped document from a source category and drop it onto a representation of a clipped document in a destination category. Accordingly, the component documents associated with the source clipped document are appended to the destination clipped document. The source clipped document remains in or is removed from the source category depending upon whether the user executes a copy operation or a move operation.

Fifth, from the Browser utility 163, a user can simply create a new clipped document. The user can then designate that the clipped document is to be associated with a particular category.

Sixth, from the document viewing utility 169, a user can drag the representation of a document in a source category or the representation of a clipped document in a source category and drop it onto the representation of the document being viewed. The document or documents associated with the clipped document are appended to the document being viewed, thus creating a new clipped document in the category containing the document being viewed. Once again, the source document or source clipped document remains in or is removed from the source category depending upon whether the user executes a copy operation or a move operation.

A user can also unclip a clipped document. Upon executing an unclipping operation, the representation of the clipped document is removed and the representations of the component documents are made visible in the corresponding Browser user interface. Additionally, the user can delete a clipped document, either locally or globally. From within a particular category, the user merely executes a delete clipped document command, wherein the Browser utility 163 deletes the clipped document, along with the component documents, from that category. From the "My Documents" category, a user can execute a delete clipped document command, wherein the Browser utility 163 deletes the clipped document from every category.

Other software applications, such as Microsoft Office, employ compound document entities; however, these entities differ from clipped documents. For example, Microsoft Office uses "binders". Unlike clipped documents, binders only allow a user to mix Microsoft Excel, Powerpoint and Word documents. But binders do not allow the user to bind non-Microsoft Office formatted documents. Another major difference between binders and clipped documents is that binders are monolithic documents. In other words, the component documents cannot be individually manipulated. In addition, a user of Microsoft Office cannot e-mail a binder to another person unless the other person is running Microsoft Office. Yet another difference between Microsoft Office binders and clipped documents is the fact that binders maintain a physical copy of each component document whereas the present invention employs a virtual document storage feature. As explained above, this is an inefficient usage of memory space, and it can lead to multiple versions of a single document, since a single document may be stored in more than one binder.

FILE HELPER

A next utility is the file helper or archiving utility 173. The file helper utility keeps the document collection tidy. More specifically, the file helper utility automatically archives files onto removable media, if, in general, those files have not been accessed or modified for a long period of time. The file helper utility also notifies the user if files have old dates; it notifies the indexing engine and the DCO file when files are taken off-line; it monitors the document collection for document duplicates; and it organizes a separate index of off-line documents.

Figure 18:
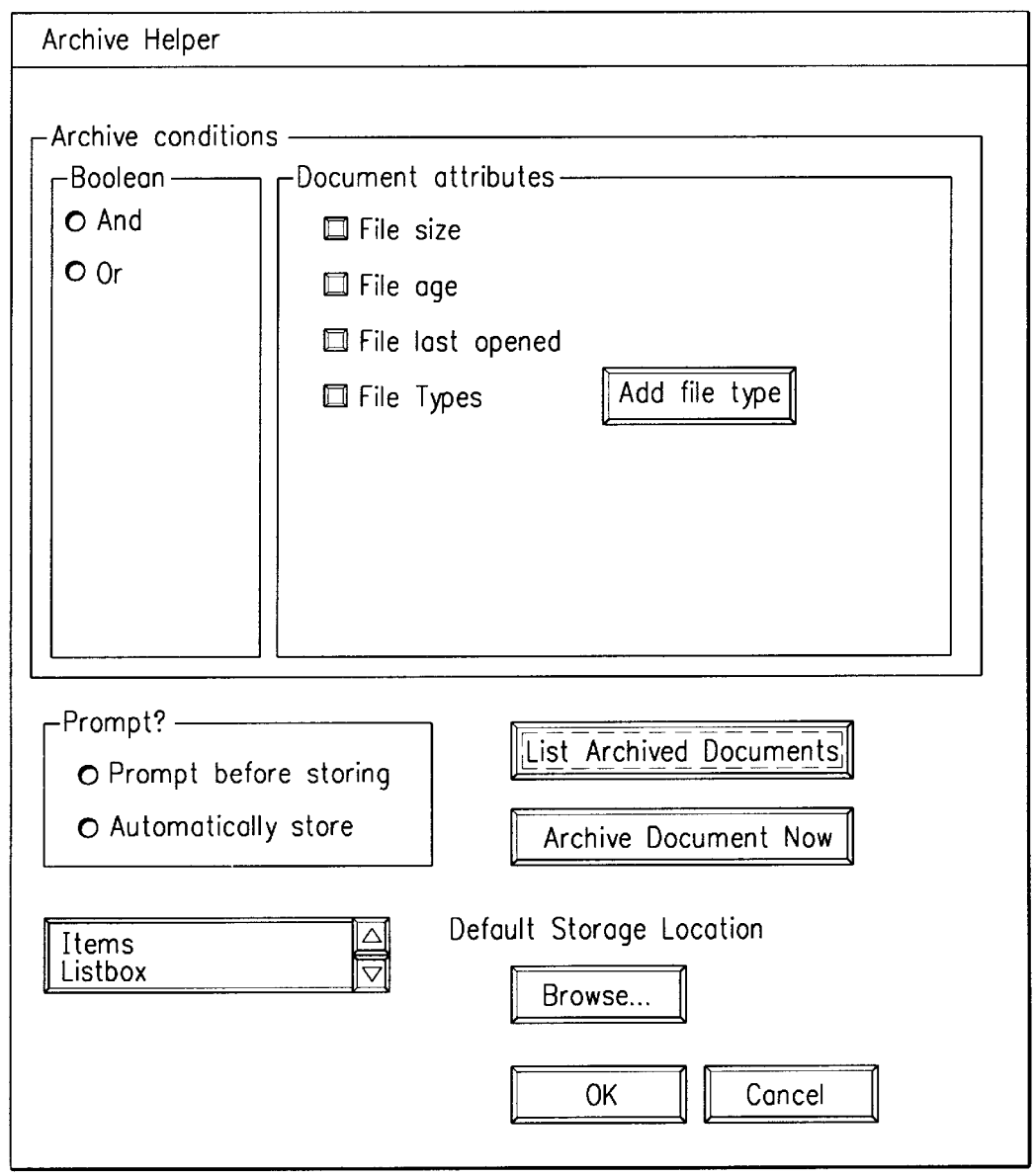
FIG. 18 is a screen display of the file helper user interface.
Figure 19:
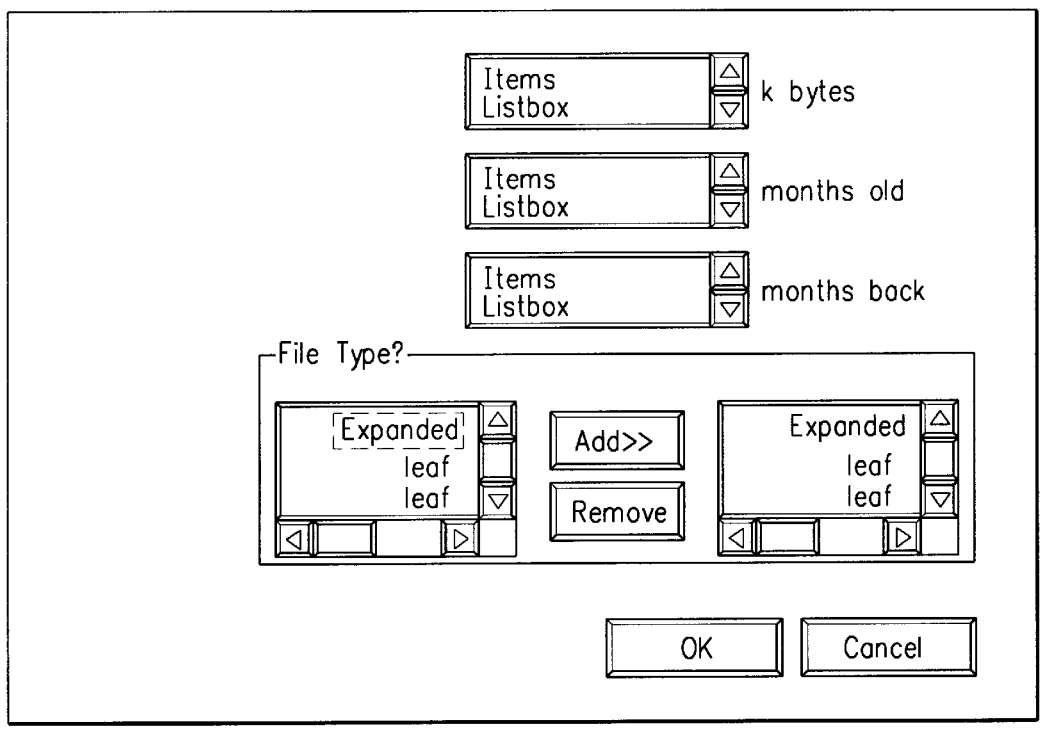
FIG. 19 is a screen display of a secondary file helper utility user interface.

The file helper utility has a user interface, as illustrated in FIG. 18. As one skilled in the art will readily appreciate, the user interface illustrated in FIG. 18 permits the user to select one or more various conditions that trigger the automatic archiving process. The file helper utility also prompts a user, if the user so desires, before the system archives a document in accordance with the user selected options. In addition, there are a number of secondary user interfaces associated with the file helper utility 173, for example, the user interface illustrated in FIG. 19. The secondary user interfaces are utilized for entering more specific archiving conditions, such as the exact size of a document or the age of a document that trigger this archiving utility 173.

The file helper utility continues to maintain a link to or an index of each archived document, by storing a thumbnail representation of each archived document and/or the STG file associated with each archived document. Therefore, if a user wishes to run a search involving archived documents, the search engine is capable of searching the content of the thumbnail representations and/or the STG file data fields of each archived document. If the search identifies one or more archived documents, the file helper utility prompts the user to make the appropriate removable storage medium available (e.g., prompt the user to insert a particular floppy disk) in the event the user wishes to access the archived document.

DIRECTORY MONITOR

Figure 20:
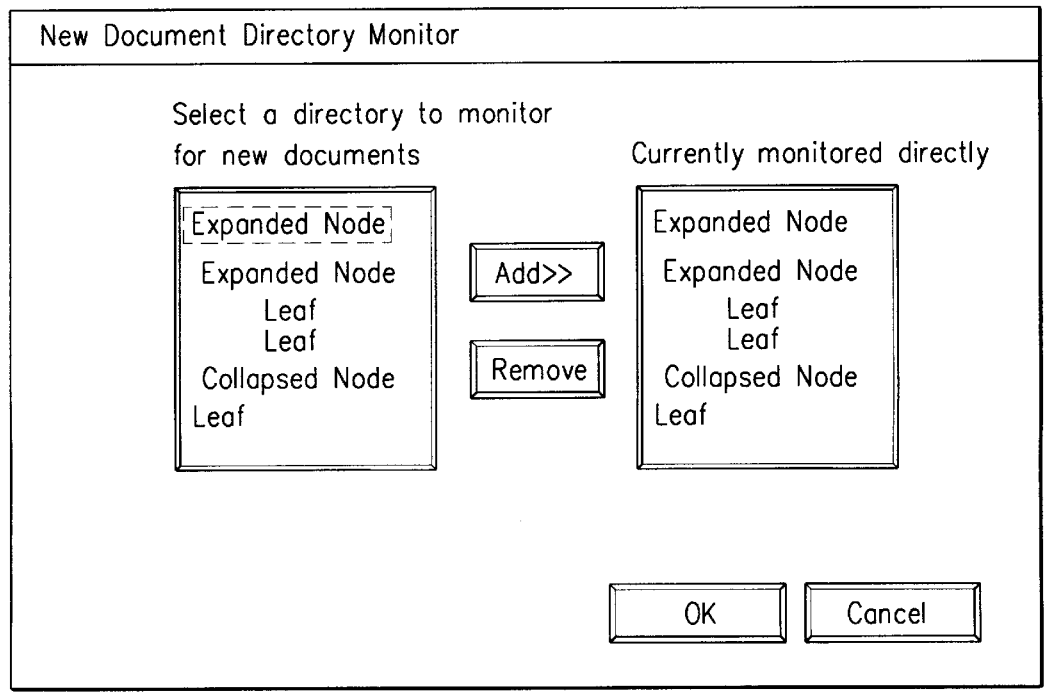
FIG. 20 is a screen display of the directory monitor user interface.

There is also a directory monitor utility 175 that monitors specific user-identified directories, categories, and/or folders on a particular storage device for newly stored documents. When the directory monitor utility 175 identifies newly stored documents, the categorization utility 159 automatically categorizes these documents into the appropriate categories or smart folders, as described above. Again, there is a user interface associated with the directory monitor utility 175 as illustrate in FIG. 20. As shown, the user interface provides the user with a vehicle to select the particular directories to be monitored.

TASK MANAGER

The task manager utility 165 is yet another utility employed by the present invention. The task manager utility 165 is a multi-threaded single instance utility that is launched when the host computer is booted after loading the software associated with the present invention or upon a first request for one of its services after the utility has been turned off. Its main function, however, is to facilitate background or batch processing jobs such as importing documents into the document collection.

Figure 21:
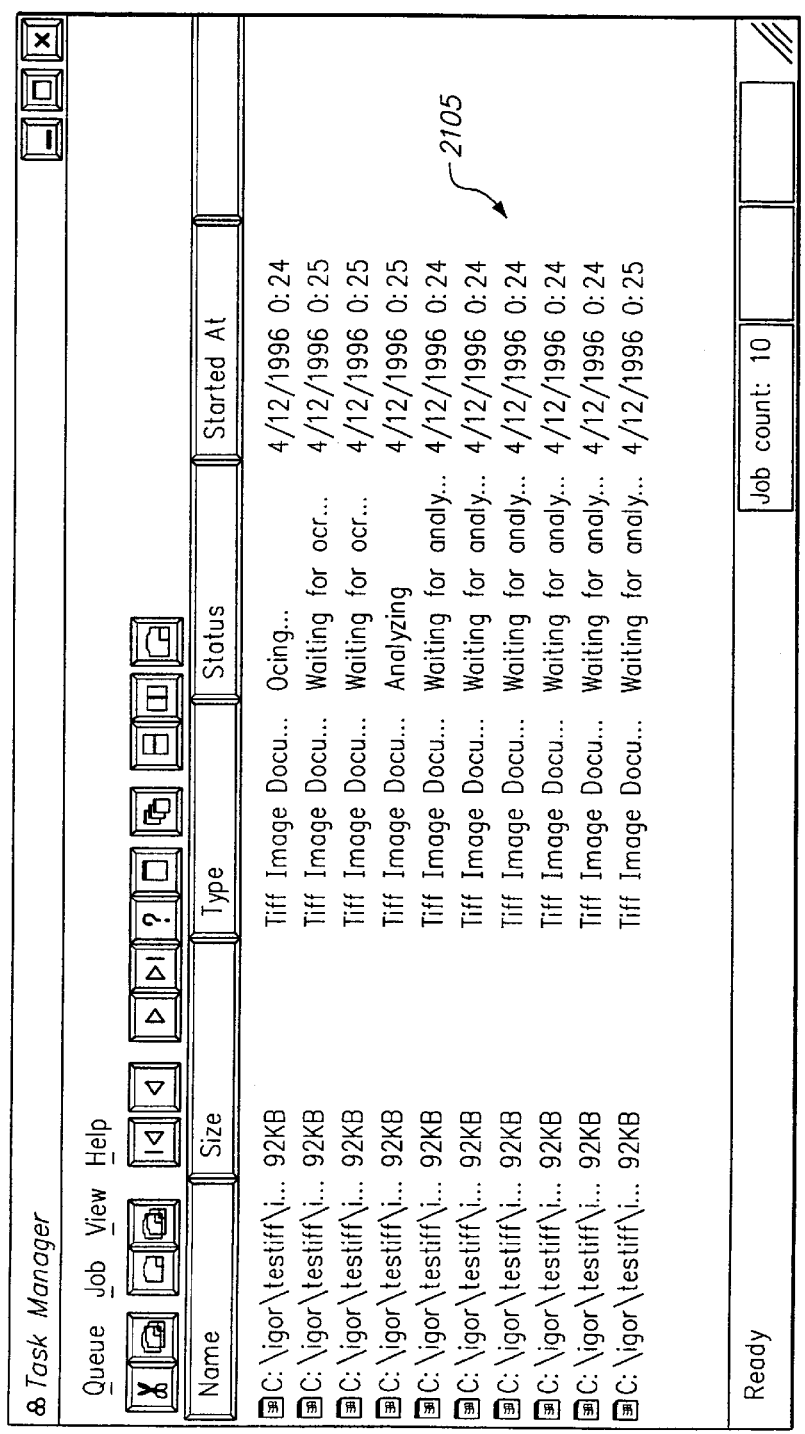
FIG. 21 is a screen display of the task manager user interface.

The task manager utility 165 has a corresponding user interface, as illustrated in FIG. 21. The user interface includes a queue for displaying a list 2105 of the various tasks currently being undertaken by the task manager utility 165.

Figure 22:
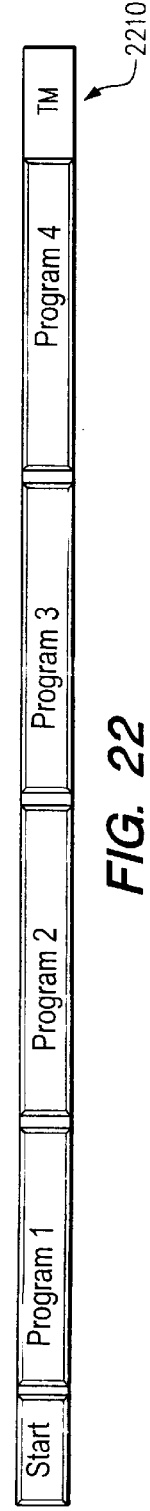
FIG. 22 is a screen display of the system task bar illustrating the task manager icon.

When the task manager utility 165 is first initiated, for example, if the user executes a document import request, a small icon 2210 appears in the system task bar at the bottom of the display, as illustrated in FIG. 22. If the user selects the icon (with a mouse/cursor), the task manager utility 165 responds by opening the task manager utility 165 user interface.

The task manager utility 165 user interface also includes a number of "pull-down" menus, as illustrated in FIG. 21, including a QUEUE menu and a JOB menu. The QUEUE menu includes, among other options, the option of stopping the task manager utility 165 from scanning or indexing a document, purging the queue, and terminating the task manager utility 165. The JOB menu provides options that include purging a document from the queue, and changing the priority in which the task manager utility 165 executes the jobs in the queue.

ANNOTATIONS

The present invention has an annotations utility 177 which provides the user with the option of adding annotations to a document before a scanning operation is completed. This feature allows the user to automatically manipulate an image document, including the added annotations, immediately upon completion of the scan. The user is also permitted to add annotations of almost any type. For example, text annotations, free-form annotations (i.e., pictures and graphs), and waveform (i.e., audio) annotations. Drag and drop annotations are also available, if a user wishes to insert an annotation from one document into another document. The user can even print annotations apart from the remainder of the accompanying document.

PROPERTY SHEETS

The present invention also has a property sheet utility 179. The property sheet utility 179 allows a user to display a property sheet for each individual category, clipped document and/or document. Property sheets are yet additional user interfaces which convey specific summary information about a given category, document and/or clipped document. This summary information may include particular document attributes such as document size, date, author, or the number of key words or attributes contained in a document. Moreover, the summary information for a particular document is stored in the STG file corresponding to that document. Table I contains a list of potential attributes that might appear in a property sheet depending upon whether the property sheet pertains to a category, a clipped document or a document. Property sheets might also include a brief synopsis or abstract describing the contents of a given document. In accordance with a preferred embodiment, property sheets can be accessed either through the Browser utility 163 or the document viewing utility 169.

TABLE I

| CATEGORY | CLIPPED DOCUMENT | DOCUMENT |
| --- | --- | --- |
| •location | •size | •image type (with values of color 8-bit gray scale, 4-bit gray scale, or binary) |
| •size | •name | |
| •folder members | •created date | |
| •name | •modified date | •doc type (scanner/image/tiff, word processor document, etc.) |
| •creation date | •accessed date | |
| •modified date (modifying either criteria changed or the documents it contains changes) | •author | •width dimension (for scanned documents) |
| | •title | |
| | •last saved by | •height dimension (for scanned documents) |
| | •subject | |
| •author | | •size |
| •criteria, threshold score, and exemplar document | | •physical storage_id |
| | | •storage media (e.g., the type of media on which a document is stored) |
| •document members | | |
| •clipped document members | | |
| •inclusion list | | •name |
| •exclusion list | | •modified date |
| •automatically included documents | | •accessed date |
| | | •author |
| •contains (number of documents, clipped documents, etc.) | | •key words |
| | | •summary |
| | | •title |
| •static/dynamic (an inactive or hungry category | | •subject |
| | | •categories (i.e., the categories to which a document belongs) |
| •up-to-date (meaning is the category current with regards to the documents held in the collection) | | •clipped documents (i.e., the clipped documents to which a document belongs) |
| | | •query hits |
| | | •relevance score (i.e., the relevance score the document has to the query) |
| | | •revision number |
| | | •text information (e.g., number of characters, etc.) |

The invention has been described with reference to a preferred exemplary embodiment. However, it will be readily apparent to those skilled in the art that it is possible to embody the invention in forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a computer-based document management system, a method of identifying an electronic document in an electronic document collection, said method comprising the steps of:

extracting summary information from the electronic document based upon an electronic analysis of the electronic document:

storing the extracted summary information, regardless of document type or document format, in a document data structure associated with the electronic document;

displaying a representation of the electronic document; and activating an electronic display containing the extracted summary information stored in the document data structure associated with the electronic document.

2. The method of claim 1, wherein the step of activating the electronic display containing the extracted summary information comprises the step of:

positioning a cursor over the displayed representation of the electronic document.

3. The method of claim 1, wherein the step of activating the electronic display containing the extracted summary information comprises the step of:

selecting an electronic button presented on the electronic display.

4. In a computer-based document management system, a method of browsing a collection of electronic documents stored in memory, said method comprising the steps of:

electronically analyzing each of a plurality of electronic documents;

based on the electronic analysis of each of the plurality of electronic documents storing browsable information for each of the plurality of electronic documents into a corresponding document data structure; and electronically displaying the browsable information contained in the document data structure for at least one of the plurality of electronic documents.

5. The method of claim 4, wherein said step of electronically displaying the browsable information for at least one of the plurality of electronic documents comprises the step of:

displaying a property sheet.

6. The method of claim 5, wherein the property sheet includes an abstract.

7. The method of claim 5, wherein the property sheet includes search criteria utilized for identifying the electronic document during an electronic document search.

8. The method of claim 4 further comprising the steps of:

displaying a representation of the electronic document; and activating the browsable information display.

9. The method of claim 8, wherein the displayed representation of the electronic document is an icon.

10. The method of claim 8, wherein the displayed representation of the electronic document is a thumbnail.

11. The method of claim 8, wherein said step of activating the browsable information display comprises the step of:

positioning a cursor over the representation of the electronic document.

12. The method of claim 8, wherein said step of activating the browsable information display comprises the step of:

selecting an icon.

13. The method of claim 4, wherein the document data structure is a STG file.

14. A computer-readable storage medium having stored therein an electronic document management program which executes the steps of:

automatically and electronically analyzing each of a plurality of electronic documents in a collection of electronic documents;

extracting document summary information from each of the plurality of electronic documents based on the electronic analysis of each electronic document;

storing the extracted document summary information relating to each of the plurality of electronic documents in a corresponding document data structure regardless of document format or document type; and displaying, on a computer screen, at least one property sheet, wherein each of the at least one property sheet corresponds with a different one of the plurality of electronic documents, and wherein each of the at least one property sheets contains the document summary information relating to the corresponding electronic document.

15. The computer-readable storage medium in accordance with claim 14, wherein said program further comprises the executable steps of:

displaying a representation of the electronic document that corresponds to the at least one property sheet that is to be displayed on the computer screen; and activating the display of the at least one property sheet.

16. The computer-readable storage medium in accordance with claim 15, wherein the representation of the electronic document is an icon.

17. The computer-readable storage medium in accordance with claim 15, wherein the representation of the electronic document is a thumbnail.

18. The computer-readable storage medium in accordance with claim 15, wherein said executable step of activating the display of the at least one property sheet comprises the executable step of:

positioning a cursor over the representation of the electronic document that corresponds to the at least one property sheet that is to be displayed on the computer screen.

19. The computer-readable storage medium in accordance with claim 15, wherein said executable step of activating the property sheet comprises the executable step of:

selecting an electronic button on the display corresponding to the property sheet.

20. The computer-readable storage medium in accordance with claim 14, wherein the summary information includes an abstract.

21. The computer-readable storage medium in accordance with claim 14, wherein the summary information includes electronic search criteria.

22. The computer-readable storage medium in accordance with claim 14, wherein the summary information includes a document attribute, and wherein the document attribute is selected from a group consisting of a document title, a document author, a document length, or a date document was last modified.

23. The computer-readable storage medium in accordance with claim 14, wherein the executable step of storing document summary information comprises the executable step of:

storing the summary information in an STG file.

24. The method of claim 1, wherein the step of activating the electronic display containing the extracted summary information comprises the step of:

displaying a property sheet.

\* \* \* \* \*